US012050854B1

(12) United States Patent
Shan et al.

(10) Patent No.: US 12,050,854 B1
(45) Date of Patent: Jul. 30, 2024

(54) AUDIO-BASED PATIENT SURVEYS IN A HEALTH MANAGEMENT PLATFORM

(71) Applicant: Verily Life Sciences LLC, Mountain View, CA (US)

(72) Inventors: Peilun Shan, San Francisco, CA (US); Aurora Adkins, Redwood City, CA (US); Thomas Rudick, San Francisco, CA (US); Lucy Boyd Schachter, Jamaica Plain, MA (US); Bella Powers, Redwood City, CA (US); Nikhil Roy, Sunnyvale, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 502 days.

(21) Appl. No.: 17/245,649

(22) Filed: Apr. 30, 2021

Related U.S. Application Data

(60) Provisional application No. 63/019,082, filed on May 1, 2020.

(51) Int. Cl.
*G06F 40/10* (2020.01)
*G06F 40/30* (2020.01)
*G06F 40/40* (2020.01)

(52) U.S. Cl.
CPC .............. *G06F 40/10* (2020.01); *G06F 40/30* (2020.01); *G06F 40/40* (2020.01)

(58) Field of Classification Search
CPC ........... G06F 40/10; G06F 40/30; G06F 40/40
See application file for complete search history.

(56) References Cited

U.S. PATENT DOCUMENTS

| | | | |
|---|---|---|---|
| 10,678,406 B1* | 6/2020 | Banfi | G06F 9/453 |
| 11,024,304 B1* | 6/2021 | Smith | G10L 15/22 |
| 11,457,863 B1* | 10/2022 | Roy | G16H 40/63 |
| 2014/0074454 A1* | 3/2014 | Brown | G10L 15/08 |
| | | | 704/235 |
| 2015/0169284 A1* | 6/2015 | Quast | G06F 16/9535 |
| | | | 704/275 |

\* cited by examiner

*Primary Examiner* — Pierre Louis Desir
*Assistant Examiner* — Keisha Y. Castillo-Torres
(74) *Attorney, Agent, or Firm* — Perkins Coie LLP

(57) ABSTRACT

A technique is described for performing audio-based patient surveys to obtain patient data for use in a health management platform. A virtual assistant is simulated to participate in a natural language conversation with a patient. As part of the conversation, the virtual assistant generates and outputs an audible natural language message that is then presented via a speaker at a user computing device. The audible natural language message includes a prompt for the user to provide a natural language reply. Reply data indicative of a reply by the user is then received and processed to generate and/or update patient data associated with the patient. The patient data is then applied by the health management platform to assist the patient in managing a chronic health condition.

21 Claims, 14 Drawing Sheets

AUDIO-BASED PATIENT SURVEYS IN A HEALTH MANAGEMENT PLATFORM

CROSS-REFERENCE TO RELATED APPLICATIONS

This application claims priority to U.S. Provisional Application No. 63/019,082, titled "Audio-Based Patient Surveys in a Health Management Platform" and filed on May 1, 2021, which is incorporated by reference herein in its entirety.

TECHNICAL FIELD

The disclosed teachings relate to techniques for self-management of chronic health conditions. The disclosed teachings more particularly relate to a technique for performing audio-based patient surveys by simulating a virtual assistant to participate in natural language conversations with a patient.

BACKGROUND

Quality of life for patients facing chronic health conditions such as diabetes can be significantly improved through taking active measures to manage such conditions. Active measures for managing a chronic health condition can include, for example, exercise, maintaining a healthy diet, actively monitoring physiological data, staying on top of prescription medications, and other measures. Clinical physicians and health coaches can help patients manage chronic health conditions; however, due to infrequent interaction, patients are left to take most active measures on their own.

DETAILED DESCRIPTION

Overview

Figure 1:
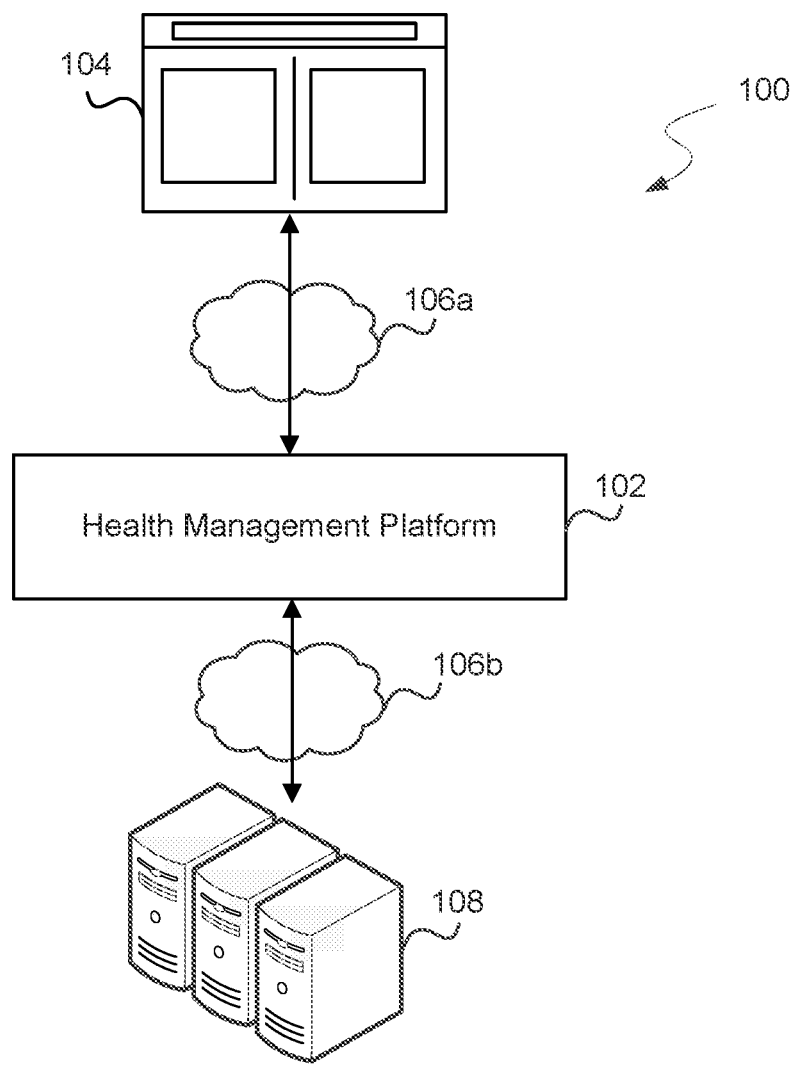
FIG. 1 shows an example network environment that includes a health management platform.

A patient with a chronic health condition such as diabetes may need assistance to help manage his or her chronic health condition. Clinical interactions with patients are infrequent, so it can be difficult for a clinician to follow transitions in the health state of a patient and intervene to assist the patient in managing a chronic health condition. Computer-implemented solutions have been developed to help guide patients with chronic health conditions to supplement the care provided by clinicians; however, such systems rely on various input data including input data from the patients to effectively provide such guidance. This presents a challenge when faced with patients, such as elderly and/or disabled patients, that may have difficulty using traditional text-based data input forms or other graphical user interface features to provide such input data.

Introduced here, therefore, is a computer-implemented technique for performing audio-based patient surveys to obtain patient data that does not rely on editable text-based forms or other graphical user interface features. The introduced technique can be implemented to obtain patient data using natural language conversations between the patient (or another user) and a simulated virtual assistant. The patient data can then be applied by one or more functionalities of a computer-implemented health management platform to assist the patient in managing a chronic health condition. In an example embodiment, a virtual assistant is simulated to participate in a natural language conversation with a patient (or other user) to obtain data associated with the patient. As part of the conversation, the virtual assistant may generate and output a natural language message that is then presented via a speaker at a user computing device. The audible natural language message may include a prompt for the patient (or other user) to provide a natural language reply. Reply data indicative of a natural language reply by the patient (or other user) is then received and processed to generate and/or update patient data associated with the patient. The patient data generated and/or updated through this audio-based patient survey process can then be applied by the health management platform to assist the patient in managing a chronic health condition.

The health management platform can "assist" a patient in managing a chronic health condition in various direct and/or indirect ways. Direct assistance in managing a chronic health condition may include, for example, presentation of explicit recommendations to improve the health state of the patient. Such recommendation may be for the patient to perform certain activities (e.g., exercise), eat certain foods (e.g., healthier options), take health measurements (e.g., take blood glucose measurements), consult with health professionals, review educational materials, etc. For example, if the patient needs to exercise more, a service associated with health management platform can explicitly recommend, through visual and/or audible communication, a particular exercise for the user to perform.

Conversely, indirect assistance may refer to various indirect actions, visual cues, passive interactions, etc. that are tailored to subtly influence a patient's behavior in a certain direction to manage a chronic health condition. For example, in some embodiments, a service associated with the health management platform may provide access to a virtual sidekick that is presented via a graphical user interface (GUI). The appearance and/or actions by the virtual sidekick can be tailored, based on patient data, to build a relationship between the virtual sidekick and the patient thereby increasing the behavioral influence the virtual sidekick has on the patient. In this sense, the virtual sidekick can act as a partner to the patient in the patient's journey to manage his or her chronic health condition.

Terminology

References in this description to "an embodiment" or "one embodiment" mean that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of operations performed in any of the processes described here are exemplary. However, unless contrary to physical possibility, the operations may be performed in various sequences and combinations. For example, operations could be added to, or removed from, the processes described here. Similarly, operations could be replaced or reordered. Thus, descriptions of any processes are intended to be open-ended.

Technology Overview

FIG. 1 illustrates an example network environment 100 that includes a health management platform 102. An individual can interface with the health management platform 102 via an interface 104 to access the various functionalities described herein. For example, in some embodiments, the health management platform 102 is associated with one or more computer programs configured to simulate a virtual assistant to perform an audio-based patient survey to obtain patient data from a user. The "user" may be any person accessing the health management platform 102 including a patient with a chronic health condition such as diabetes or another person with an interest in the health of the person with the chronic health condition such as family member, hired caretaker, a clinician, or a health coach. Accordingly, "patient data" may be associated with a patient that is the user or a patient that is not the user.

The health management platform 102 may be connected to one or more networks 106a-b. The network(s) 106a-b can include local area networks (LANs), wide area networks (WANs), metropolitan area networks (MANs), cellular networks, the Internet, etc. The health management platform 102 may also communicate with other computing devices over a short-range communication protocol, such as Bluetooth® or Near Field Communication (NFC).

An individual can access various functionalities provided by the health management platform via interface 104. The interface 104 may be accessible via one or more of a web browser, a desktop software program, a mobile application, an over-the-top (OTT) application, or any other type of application configured to present an interface to a user. Accordingly, the interface 104 may be accessed by the user on a user computing device such as a personal computer, tablet computer, personal digital assistant (PDA), mobile phone, game console (e.g., Sony PlayStation® or Microsoft Xbox®), music player (e.g., Apple iPod Touch®), wearable electronic device (e.g., a watch or fitness band), network-connected ("smart") device (e.g., a television or home assistant device), virtual/augmented reality system (e.g., a head-mounted display such as Oculus Rift® and Microsoft HoloLens®), or some other electronic device.

In some embodiments, interface 104 may represent an audio interface through which audible outputs generated by the health management platform 102 (e.g., speech generated by a virtual assistant) are presented to a user and through which audible inputs (e.g., speech by the user) are received from the user. In such embodiments, interface 104 may include or utilize audio input devices such as microphones and audio output devices such as speakers that are integrated with or otherwise communicatively coupled to a user computer device. In some embodiments, interface 104 may additionally include a graphical user interface (GUI) though which visual outputs are displayed to a user and inputs are received from the user.

In some embodiments, the health management platform 102 is hosted locally. That is, one or more of the computer programs associated with the health management platform 102 may reside on the computing device used to access the interface 104. For example, the health management platform 102 may be embodied as a mobile application executing on a user's mobile phone. In some embodiments, one or more components of the health management platform 102 may be executed by a cloud computing service, for example, operated by Amazon Web Services®, Google Cloud Platform™, Microsoft Azure®, or a similar technology. In such embodiments, the health management platform 102 may reside on a host computer server that is communicatively coupled to one or more content computer servers 108. The content computer server(s) 108 can include different types of data, user information (e.g., profiles, credentials, and health-related information), and other assets. Additionally, or alternatively, such information could be stored on the host computer server. In some embodiments, one portion of the health management platform 102 may be hosted locally while another portion is hosted remotely (e.g., at a cloud computing service). For example, the health management platform 102 may comprise a mobile application executing locally at mobile device as well as other applications executing at remote host/content servers. In such embodiments, the local and remote portions of the health management platform 102 may communicate with each other via one or more networks 106a-b.

Certain embodiments are described in the context of network-accessible interfaces. However, those skilled in the art will recognize that the interfaces need not necessarily be accessible via a network. For example, a computing device may be configured to execute a self-contained software program that does not require network access. Instead, the self-contained software program may cause necessary assets (e.g., physiological data, healthcare regimen data, processing operations, etc.) to be downloaded at a single point in time or on a periodic basis (e.g., weekly, hourly, or daily).

Figure 2:
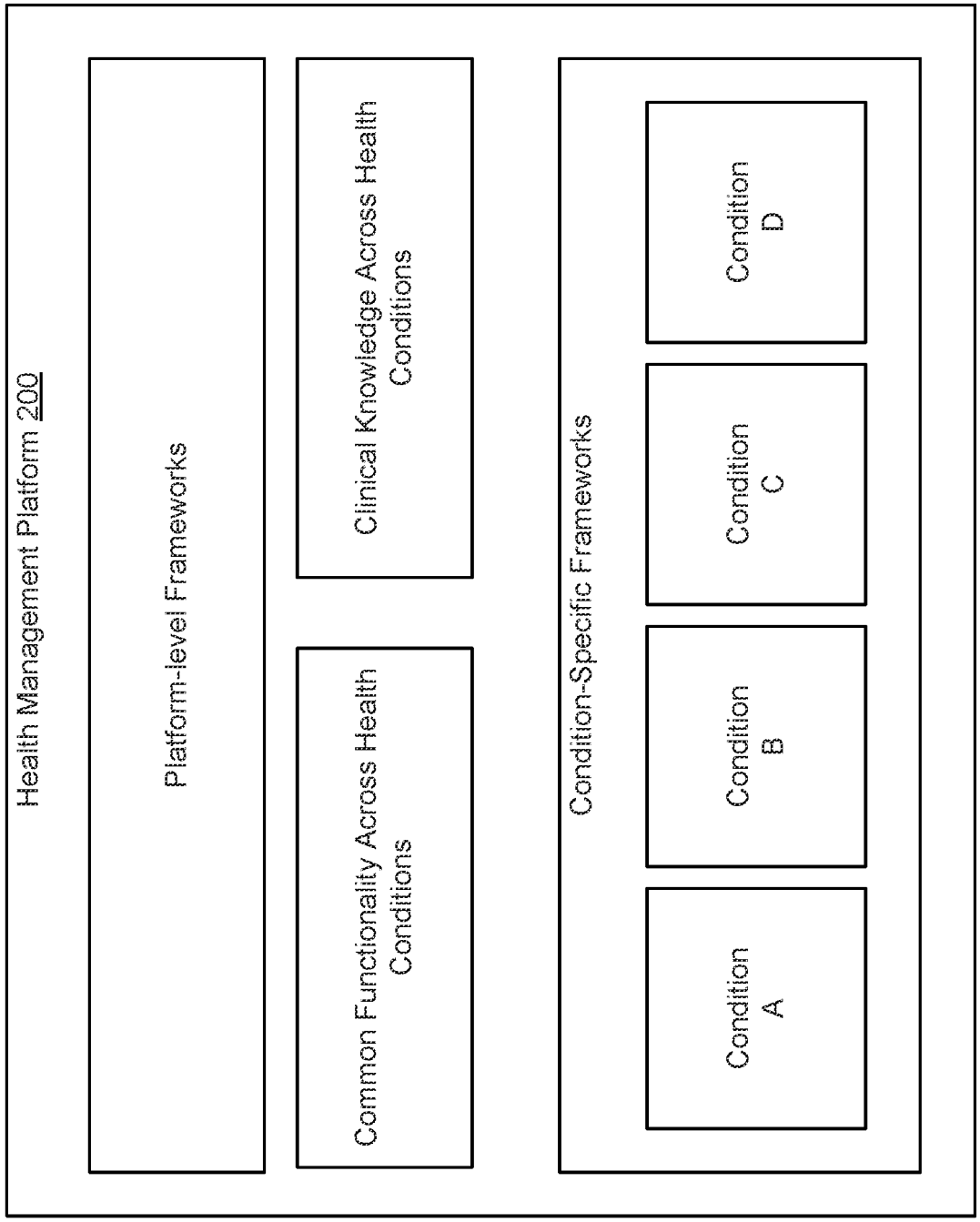
FIG. 2 shows a high-level architecture of an example health management platform.

In some embodiments, a health management platform 102 may be configured to assist users in managing multiple different chronic diseases (also referred to as health conditions). Examples of chronic diseases that may be managed using the health management platform 102 include diabetes, asthma, arthritis, cardiovascular disease, various cancers, etc. FIG. 2 shows a high-level architecture of an example health management platform 200 (e.g., similar to health management platform 102) that depicts an example organization of condition-specific frameworks. As shown in FIG. 2, the health management platform 200 may include multiple different condition-specific frameworks for managing specific chronic health conditions. Each condition-specific framework can be conceptualized as an application that can be run within the broader operating system of the health management platform 200. For example, a user with diabetes may utilize a diabetes-specific application within the health management platform 200 while another user with arthritis may utilize an arthritis-specific application. Each condition-specific framework may include specialized functionality and rely on specialized clinical knowledge associated with the condition. For example, in some embodiments, each condition-specific framework is associated with a different set of one or more computer programs, where each set of one or more computer programs is useable to simulate a virtual assistant to perform audio-based patient surveys that are specifically tailored for a given condition. However, each condition-specific framework may also rely on higher level functionalities and/or clinical knowledge associated with the health management platform 200 that are common across the various different health conditions.

Figure 3:
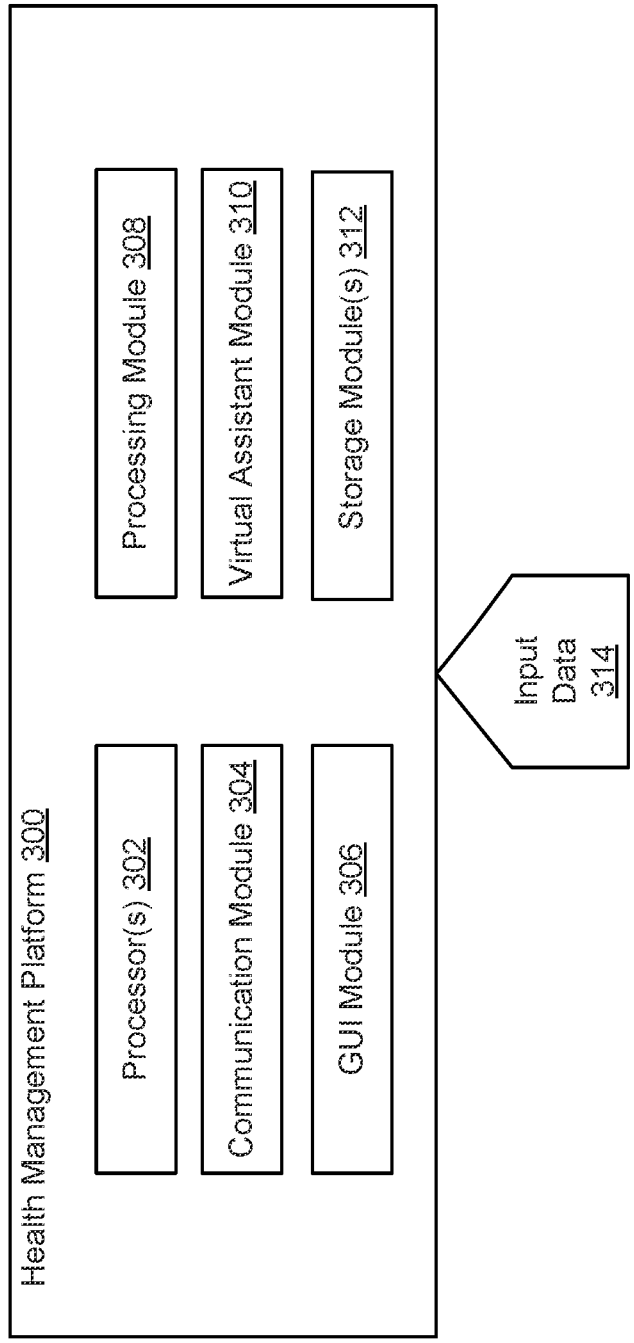
FIG. 3 shows another high-level architecture of an example health management platform.

FIG. 3 shows another high-level architecture of an example health management platform 300 (e.g., similar to health management platform 102). A user can interface with the health management platform 300 via an interface (e.g., similar to interface 104). The user may be a person with a chronic health condition such as diabetes or another person with an interest in health of the person with the chronic health condition such as a physician, health coach, etc.

The health management platform 300 can include one or more processors 302, a communication module 304, a GUI module 306, a processing module 308, a virtual assistant module 310, and one or more storage modules 312. In some embodiments, a single storage module includes multiple computer programs for performing different operations (e.g., format conversion, temporal alignment, statistical analysis), while in other embodiments, each computer program is hosted within a separate storage module. Embodiments of the diabetes management platform 300 may include some or all of these components as well as other components not shown here.

The processor(s) 302 can execute modules (e.g., the processing module 308 and the virtual sidekick module 310) from instructions stored in the storage module(s) 312, which can be any device or mechanism capable of storing information. The communication module 304 can manage communications between various components of the health management platform 300. The communication module 304 can also manage communications between the computing device on which the health management platform 300 resides and another computing device such as a user computing device.

For example, the health management platform 300 may reside on a mobile phone in the form of a mobile application. In such embodiments, the communication module 304 can facilitate communication with a network-accessible computer server responsible for supporting the mobile application. The communication module 304 may facilitate communication with various data sources through the use of application programming interfaces (APIs), bulk data interfaces, etc.

As another example, the health management platform 300 may reside on a server system that includes one or more network-accessible computer servers. In such embodiments, the communication module 304 can communicate with a software program executing on the computing device associated with the individual. Those skilled in the art will recognize that the components of the health management platform 200 can be distributed between the server system and the computing device associated with the individual in various manners. For example, some data may reside on the computing device of the individual, while other data may reside on the server system.

The GUI module 306 can generate GUIs through which an individual can interact with the health management platform 300. For example, a GUI associated with the health management platform 300 may present information to a user to assist a user in managing a chronic health condition and/or may present user interactive elements through which a user can input data, track progress on challenges, access other functionalities, etc.

The processing module 308 can apply one or more operations to input data 314 acquired by the health management platform 300 to provide certain functionalities described herein.

A virtual assistant module 310 may comprise one or more computer programs operable to simulate an assistant that can take part in natural language conversations with a user, for example, to obtain patient data. In some embodiments, the virtual assistant may be implemented in the form of a chat bot that is configured to generate and present outputs in the form of natural language messages to a user and receive and process natural language replies from a user as part of a natural language conversation.

In some embodiments, the virtual assistant may be configured to present text-based messages via a messaging interface such as email, SMS, etc. Alternatively, or in addition, the virtual assistant may be configured to generate audible natural language messages (i.e., spoken messages) and present those messages via an audio output device (e.g., a speaker) of a user computing device. Similarly, the virtual assistant may be configured to receive user text-based messages via a messaging interface. Alternatively, or in addition, the virtual assistant may be configured to receive audio data that was captured using an audio input device (e.g., microphone) at the user computing device, process the audio data, and interpret the audio data as a natural language message by the user. For example, in some embodiments, a virtual assistant may use speech recognition processing to identify a string of words included in audio data received from a user computing device. The virtual assistant may further parse the string of words and apply natural language processing (NLP) to interpret meaning from the string of words indicated in the audio data. The virtual assistant may then, based on the interpreted meaning of the user's message, generate another natural language message as part of the simulated conversation.

In some embodiments, the virtual assistant may rely on pre-scripted user interactions. For example, the virtual assistant module 310 may include a database of pre-scripted reply templates that can be selected from and/or selectively modified based on interpreted messages received from a user. In some embodiments, the virtual assistant may utilize more advanced artificial intelligence techniques. For example, virtual assistant module 310 may include one or more machine learning models that are configured to process input user messages to interpret those messages and generate natural language replies to the user messages.

In some embodiments, machine learning models utilized by the virtual assistant module may be trained and retrained using various input data. For example, machine learning models utilized to generate and/or interpret natural language messages may be trained using text-based and/or audio-based interaction data associated with recorded interactions between various individuals such as patients, health coaches, clinicians, etc.

A learning module (separate from or part of the virtual assistant module 310) may aggregate interaction data and other input data from various users of the health platform 300 and process such data to obtain insights on the effectiveness of certain modes of simulated natural language conversation processes, track patients, and formulate new modes of simulated natural language conversations. In some embodiments, the training module can discover new techniques for improving the effectiveness of engaging with users, thereby improving the quality of patient data obtained and effectiveness of recommended interventions to improve the health of users. For example, a learning module may discover that patients with certain attributes are more responsive to certain conversation techniques compared to other types of patients. This learned data can be used to further personalize the way that the simulated virtual assistant interacts with and engages users. The learning module can employ various machine learning algorithms and techniques to improve the effectiveness of the virtual assistant module 310. Examples of machine learning algorithms/techniques include naïve Bayes classifier algorithms, k-means clustering algorithms, support-vector machine algorithms, linear regression, logistic regression, and artificial neural networks.

In one example, a learning module can implement a form of A/B testing to refine the conversation techniques implemented by the virtual assistant 310. A/B testing (also known as split testing or bucket testing) is a method of comparing two versions of a technique against each other to determine which one performs better. A/B testing is essentially an experiment where two or more variants of a technique are presented to users at random or pseudo-randomly, and statistical analysis is used to determine which variation performs better for a given objective.

Performing an A/B test that directly compares a variation against a current experience allows for asking focused questions about changes to a technique, and then collecting data about the impact of that change. Testing takes the guesswork out of the optimization of simulated natural language conversations and enables data-informed decisions that shift conversations from speculating about what works to having evidence about what is most effective. By measuring the impact that changes have on certain metrics, the learning module may ensure that every change produces improved results.

For example, in A/B testing of a simulated conversation technique, certain content of a conversation, mode of conversation, or subject of conversation is varied between two populations of users. The change can be as simple as setting a humorous tone in one simulated mode of conversation and setting a serious tone in another simulated mode of conversation. A first group of users could be subjected to the first mode and a second group of users could be subjected to the second mode. The metrics used to determine which mode is superior could include the amount of useful data that was extracted from users, the responsiveness of users, and their level of engagement in the conversations (e.g., the period of time users remained engaged, whether they answered most questions, or if they asked follow-up questions).

In some embodiments, the virtual assistant module 310 may include a separate virtual assistant that is configured for each individual user. For example, a first user with a first chronic health condition may access a first virtual assistant for engaging in simulated conversations while a second user with a second chronic health condition may access a second virtual assistant. In some embodiments, the virtual assistants accessed by users may be the same or similar (e.g., specifically configured for a given chronic health condition) but may gradually become more customized to a particular user as additional training data is gathered and the learning module learns which conversational techniques are more effective with the particular user.

In some embodiments, one or more components of the virtual assistant module 310 may be implemented as part of a cloud-based service. For example, in some embodiments, certain functionalities (e.g., speech recognition) associated with a virtual assistant may be handled by a separate cloud-based service provided by a third party. Alternatively, in some embodiments, the virtual assistant may be part of a self-contained service that resides entirely on a user computing device and/or a remote server associated with the health management platform.

Figure 4:
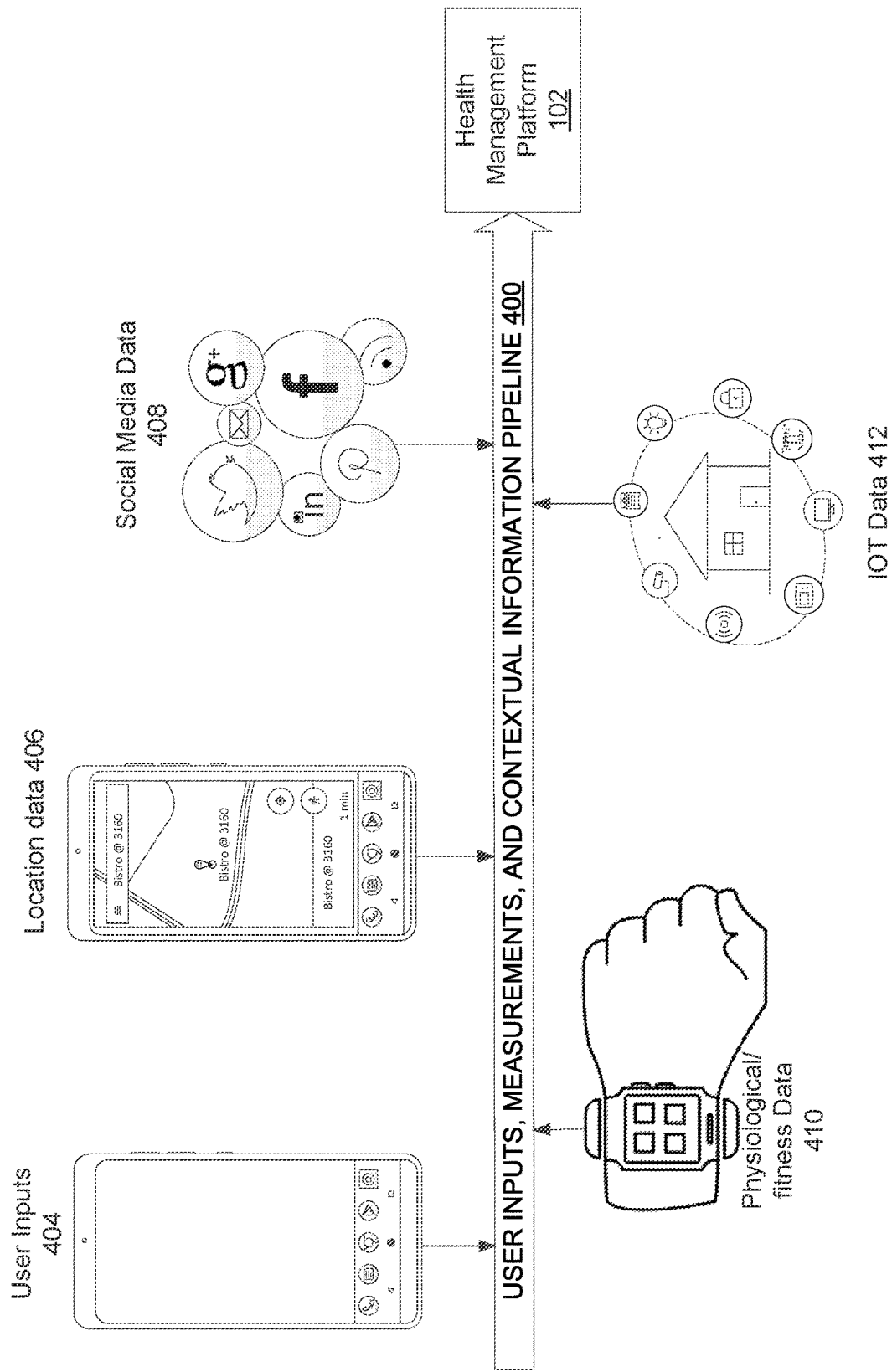
FIG. 4 shows a block diagram illustrating an example data pipeline that may be utilized by a health management platform.

The input data 314 may comprise data from multiple different sources. FIG. 4 shows a block diagram illustrating an example data pipeline 400 comprising user inputs and other contextual data that may be utilized by a health management platform to provide certain functionalities described herein. The data pipeline 400 sources user inputs and/or contextual information from various diverse sources such as user computing devices, health monitoring devices (e.g., fitness trackers, glucometers), other network-connected devices (e.g., Internet of Things (IOT) devices), online services (e.g., location services, social media, etc.), or any other suitable data sources. The data pipeline 400 may feed a health management platform 102 using one or more communication channels (e.g., computer networks 106*a-b*).

User input data 404 may include any data input by the user via the interface 104 associated with the health management platform 102. For example, in some embodiments, user inputs 404 may include audio data that is captured by a microphone at a user computing device. The audio data may include a recorded or live stream capture of a user's voice speaking into the microphone of the user computing device. In some embodiments, user input data may include inputs based on user interaction with a GUI displayed at the user computing device. For example, a user may provide input through touch gestures via a touch screen display and/or may provide input using a separate input device such as a mouse and/or keyboard.

Location data 406 may include a data indicative of a user's physical location and may be determined, for example, using a GPS receiver in a computing device associated with the user. The location information 406 can be used to determine, for example, where the user is located to determine what the weather is like at the user's location. In response to determining a user location, an online weather service can be accessed to determine weather data at the user's location. The location data may also be used to determine, for example, whether the user visited a particular location that may be relevant to the user's chronic health condition such as doctor's office, a restaurant, or a gym. Such location data 406 may be used to, for example, present contextual information alongside a virtual assistant in a GUI.

Social media data 408 may include posts by or related to a patient and made available on social media. For example, a user may take a picture of his or her dinner and post it on Facebook™. The image or related content may be sent over the pipeline 400 to the health management platform 102. The image can be analyzed by the health management platform 102 to determine, for example, if a meal-based goal has been reached, or to trigger present contextual information regarding the user's meal via a GUI, trigger intervention challenges such as meal swap, etc.

Physiological/fitness data 410 may include data regarding a user's health and/or activity. Examples of physiological data include heart rate, blood glucose level, etc. Examples of other fitness-related (but not necessarily physiological) data include a type of exercise performed (e.g., running or jumping), a duration of the exercise (e.g., elapsed time), or other metrics associated with the exercise (e.g., distance traveled).

In some embodiments, physiological data may be acquired from a health monitoring device. For example, a physiological data specifying the blood glucose level of an individual could be generated by a glucose monitoring device. Examples of glucose monitoring devices include continuous glucose monitors (e.g., Medtronic Enlite™ Sensor) and blood glucose meters (e.g., Bayer Contour™).

Similarly, other fitness-related data may be acquired from a fitness tracking device. Examples of fitness tracking devices include mobile phones or smartwatches with motion tracking functionality or specialized fitness trackers such those offered by Fitbit™. A fitness tracking device may track a motion of a user using onboard motions sensors (e.g., one or more accelerometers) and analyze the motion to determine an activity state of the user (e.g., running vs. walking vs. stationary) and one or more fitness-related metrics (e.g., distance traveled, duration of run, calories burned, etc.). In some embodiments, a fitness tracking device may include sensors such as a heart rate monitor configured to generate physiological data such as a heart rate.

In some embodiments, the data pipeline 400 may include IOT data 412 from one or more IOT devices such as smart appliances in the home. For example, IOT data 412 may include data from a smart refrigerator that indicates when a user opens the refrigerator door or a frequency that the user opens the refrigerator door. In other example, data from a smart assistant device (e.g., an Amazon Echo™) can be used to capture audio input from a user. IOT data 412 may include contextual data from any other network-connected devices including environmental sensors, security cameras, network-connected microphones, energy monitoring devices, etc. that can be used to determine information about a state of the user.

In some embodiments, one or more of the data sources associated with the data pipeline 400 may continually upload data to the health management platform 102 so long as the data source remains communicatively coupled to a computer system on which the health management platform 102 resides (e.g., via network connection). In other embodiments, one or more of the data source may periodically upload input data to the health management platform 102 on a periodic basis (e.g., hourly, daily, weekly). In such embodiments, the input data may include multiple data sets for various time intervals (e.g., a first data set for a first time interval, a second data set for a second time interval, etc.). in some embodiments, a computer system associated with the health management platform may actively pull input data from one or more of the data sources (i.e., without requiring that the data sources upload data). In such embodiments, input data may be pulled continually as the data source remains communicatively coupled to a computer system on which the health management platform 102 resides or may be pulled on a periodic basis (e.g., hourly, daily, weekly).

The diagram depicted in FIG. 4 is shown to illustrate the disparate types of input data that can be used by a health management platform; however, not all embodiments will utilize all the data sources shown in FIG. 4. To address privacy concerns associated with the handling of such data, the health management platform 102 is configured to conform with all applicable data privacy and health information laws and regulations. Further, to provide additional safeguards, the health management platform 102 can provide users with options to enable various privacy settings to, for example, specify which input data can be gathered, how such input data can be stored and processed, how the results of the processing of input data (e.g., patient data) can be stored and used, etc. The privacy settings may also provide users with options to delete data (e.g., certain input data and/or patient data). Such privacy settings may be adjusted by the user via a GUI associated with the health management platform 102 such as interface 104.

Audio-Based Patient Surveys

Figure 5:
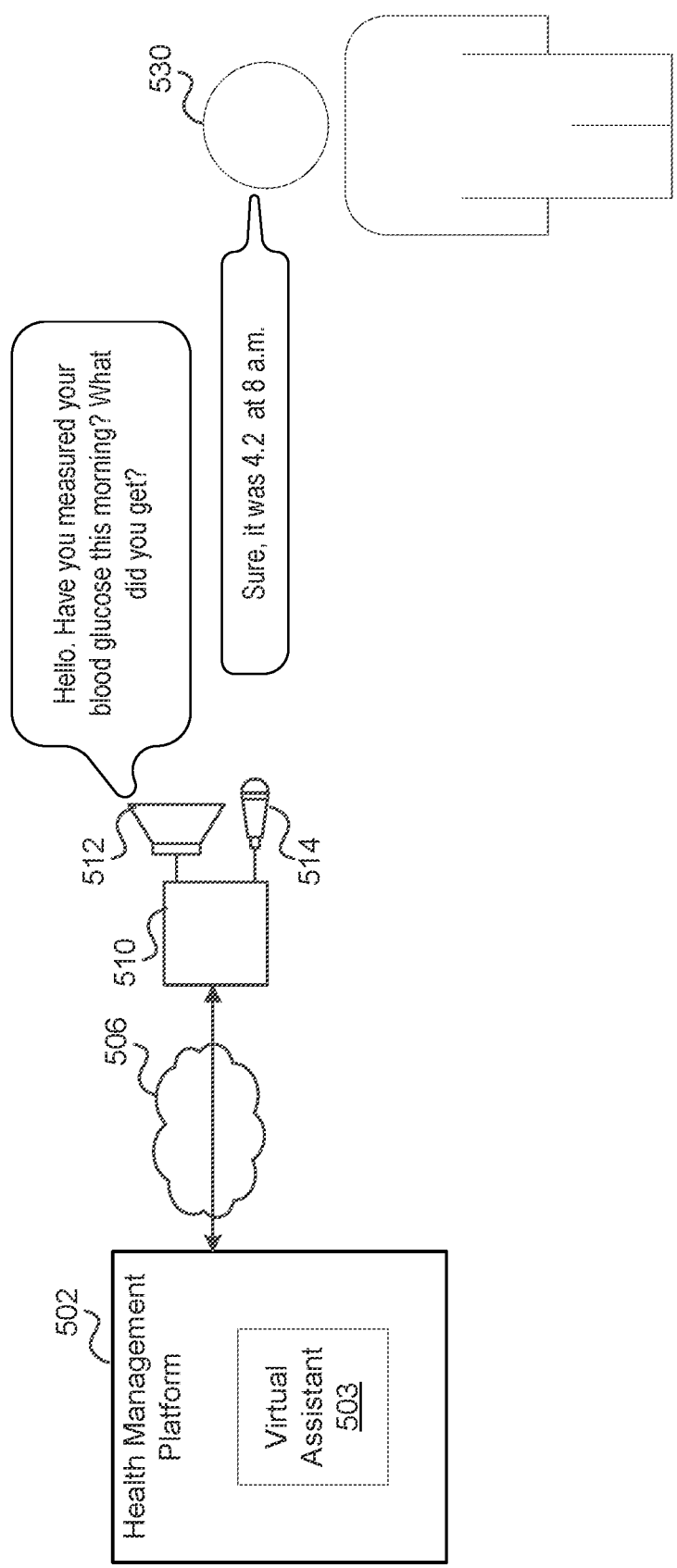
FIG. 5 shows a diagram that illustrates an example audio-based interaction between a user and a virtual assistant associated with a health management platform.

FIG. 5 shows a diagram that illustrates an example audio-based interaction between a user and a virtual assistant associated with a health management platform according to an embodiment of the introduced technique. As shown in FIG. 5, a user computing device 510 may communicate with a health management platform 502 (e.g., similar to health management platform 102) via a computer network 506 (e.g., similar to computer networks 106*a*-*b*).

The user computing device 510 may include any type of electronic device configured to process data, output audio, and capture audio. For example, the user computing device may include any one or more of a smartphone (e.g., an Apple iPhone™) a smart speaker/microphone device (e.g., Amazon Echo™), a wearable fitness tracking device (e.g., Fitbit Versa™), a health monitoring device, or a network-smart appliance (e.g., a smart refrigerator). As shown in FIG. 5, the user computing device 510 includes a speaker 512 for outputting audio and a microphone 514 for capturing audio. In some embodiments, the user computing device 510 may comprise a single integrated device (e.g., a smartphone). In other embodiments, the user computing device 510 may include a combination of multiple discrete devices (e.g., a smartphone, a glucose monitor, and a network-connected smart speaker/microphone device) that are communicatively coupled to each other via network 506 or some other short-range communication technology such as Bluetooth™. For example, in some embodiments, at least some of the processing associated with performance of the introduced technique may be performed at a first device (e.g., a smartphone), while the speaker 512 is part of a second device (e.g., a smart TV), and the microphone 514 is part of a third device (e.g., a network-connected microphone).

In the example embodiment depicted in FIG. 5, the health management platform 502 is hosted remotely at one or more computer systems that are external to the user computing device 510; however, as previously discussed, in some embodiments, the health management platform 502 may be hosted at the user computing device 510. The health management platform 502 includes a simulated virtual assistant 503. As previously discussed, the virtual assistant 503 may be simulated using one or more computer programs associated with a virtual assistant module (e.g., similar to virtual assistant module 310).

The simulated virtual assistant 503 is configured to engage in natural language conversations with a user 530 of the health management platform 502. The user 530 may represent a patient with a chronic health condition such as diabetes that is accessing the health management platform 502 for assistance in managing the chronic health condition.

As depicted in FIG. 5, a simulated natural language conversation may include the virtual assistant 503 generating or presenting audible natural language messages via the user computing device 510. For example, a computer system associated with the health management platform 502 that is executing a computer program for simulating the virtual assistant may transmit a signal, via network 506, to the user computing device 510. The signal received at the user computing device 510 may be processed and converted into audio data that is then output to the user 530 using a speaker 512. The natural language conversation may also include a natural language message returned by the user 530 to the virtual assistant 503. For example, a user's voice may be captured by a microphone 514 of the user computing device 510 and converted into audio data (e.g., using an audio codec). The audio data can then be transmitted, via network 506, to a computer system associated with the health management platform 502 that is simulating the virtual assistant 503. The virtual assistant 503 may decode the audio data (e.g., using an audio codec) and apply a speech recognition process to identify a string of words spoken by the user 530 in a message indicated in the audio data. The virtual assistant may then parse the string of words and apply NLP to interpret meaning from the string of words indicated in the audio data. The virtual assistant may then, based on the interpreted meaning of the user's message, generate another natural language message as part of the simulated conversation.

In some embodiments, the virtual assistant 503 may be implemented to obtain patient data from a user of the health management platform 502 as part of an audio-based patient survey. In this context, "patient data" may include any type of data associated with the a patient including physiological data (e.g., measurements from a health monitoring device), fitness data (e.g., current activity state, number of laps run, etc.), indicator data (e.g., a name, an email address, or other distinctive information), demographic information (e.g., age, sex, nationality, etc.), contextual data (e.g., a physical location, a physical health state, a mental health state, an emotional state, etc.), etc. For example, the scenario depicted in FIG. 5 shows the virtual assistant 503 participating in an audio-based natural language conversation with the user 530 to obtain a most recent blood glucose reading. As shown in FIG. 5, the virtual assistant presents an audible natural language message that includes a prompt for the user to reply. Specifically, the message by the virtual assistant 503 includes a prompt in the form of a series of questions that ask, "Have you measured your blood glucose this morning? What did you get?" This message by the virtual assistant 503 prompts the user 530 to reply to the questions stating "Sure, it was 4.2 at 8 a.m." The user's 530 voice is captured using the microphone 514 and converted to audio data which is transmitted to the health management platform 502, for example, via network 506. The audio data indicative of the user's 530 reply is then processed (i.e., decoded and interpreted) to generate and/or update patient data associated with a patient (in this case, user 530). For example, in the scenario depicted in FIG. 5, the patient data generated and/or updated may include a physiological metric such as a current blood glucose level. In an example embodiment, the health management platform 502 uses the reply by the user 530 to generate a new data point for a tracked metric such as blood glucose level over time. In other words, a blood glucose level of 4.2 mmol/L at 8:00 a.m. on the current day may be added as a most recent data point in a set of a plurality of data points for a tracked metric such as blood glucose level.

In some embodiments, the virtual assistant 503 may apply context-specific natural language processing in order to interpret responses by the user 530. For example, in the scenario depicted in FIG. 5, the user 530 replies with a value "4.2" but does not specify a unit associated with the value. However, by applying contextual knowledge (e.g., based on the previous message transmitted to the user, the health condition of the user, typical blood glucose level ranges for humans, etc.), the virtual assistant 503 may infer a unit of measurement (in this case mmol/L) and associate that with the identified value of 4.2 when generating the patient data point.

The scenario depicted in FIG. 5 shows a simple natural language conversation that includes one message from the virtual assistant 503 with a prompt and one message from the user 530 with a reply. This example conversation is provided for illustrative purposes but is not to be construed as limiting. In some embodiments, the virtual assistant 503 may be simulated to participate in more complex conversations involving multiple messages exchanged back and forth with a user 530.

Figure 6:
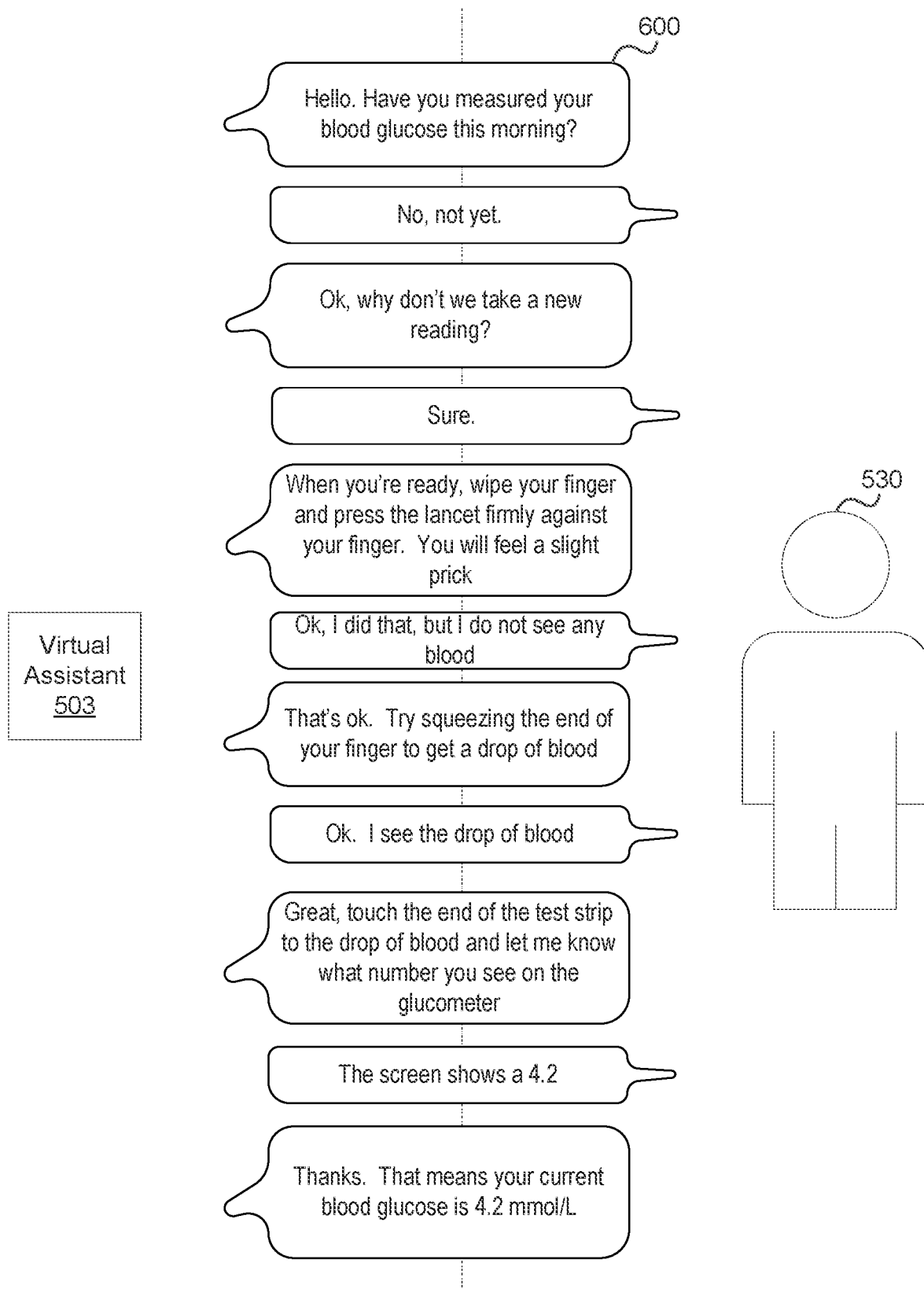
FIG. 6 depicts an example audio-based natural language conversation between a virtual assistant and a user.

FIG. 6 depicts an example audio-based natural language conversation 600 between a virtual assistant 503 and a user 530 in which the virtual assistant 503 guides the user 530 in obtaining physiological data such as a blood glucose reading using a health monitoring device such as a blood glucose monitor. As shown in FIG. 6, the natural language conversation 600 may include a sequence of messages that guide the user to perform a sequence of actions such as pricking a finger using a lancet to draw a blood sample, applying a test strip to the blood sample, reading the measured blood glucose level displayed on a screen of the glucometer, and reciting the read blood glucose level. One or more of the messages output by the virtual assistant 503 may prompt the user 530 to perform an action before providing an audible reply. For example, as part of the sequence of messages of conversation 600, the virtual assistant 503 presents a message that states, "touch the end of the test strip to the drop of blood and let me know what number you see on the glucose meter." In other words, by prompting the user to perform a measurement action and reply with a measured value, the health monitoring platform can obtain updated patient data (in this case a blood glucose level) without needing to communicatively connect to a separate monitoring device and without requiring the user to find a correct data input field via a GUI to input the value.

Figure 7:
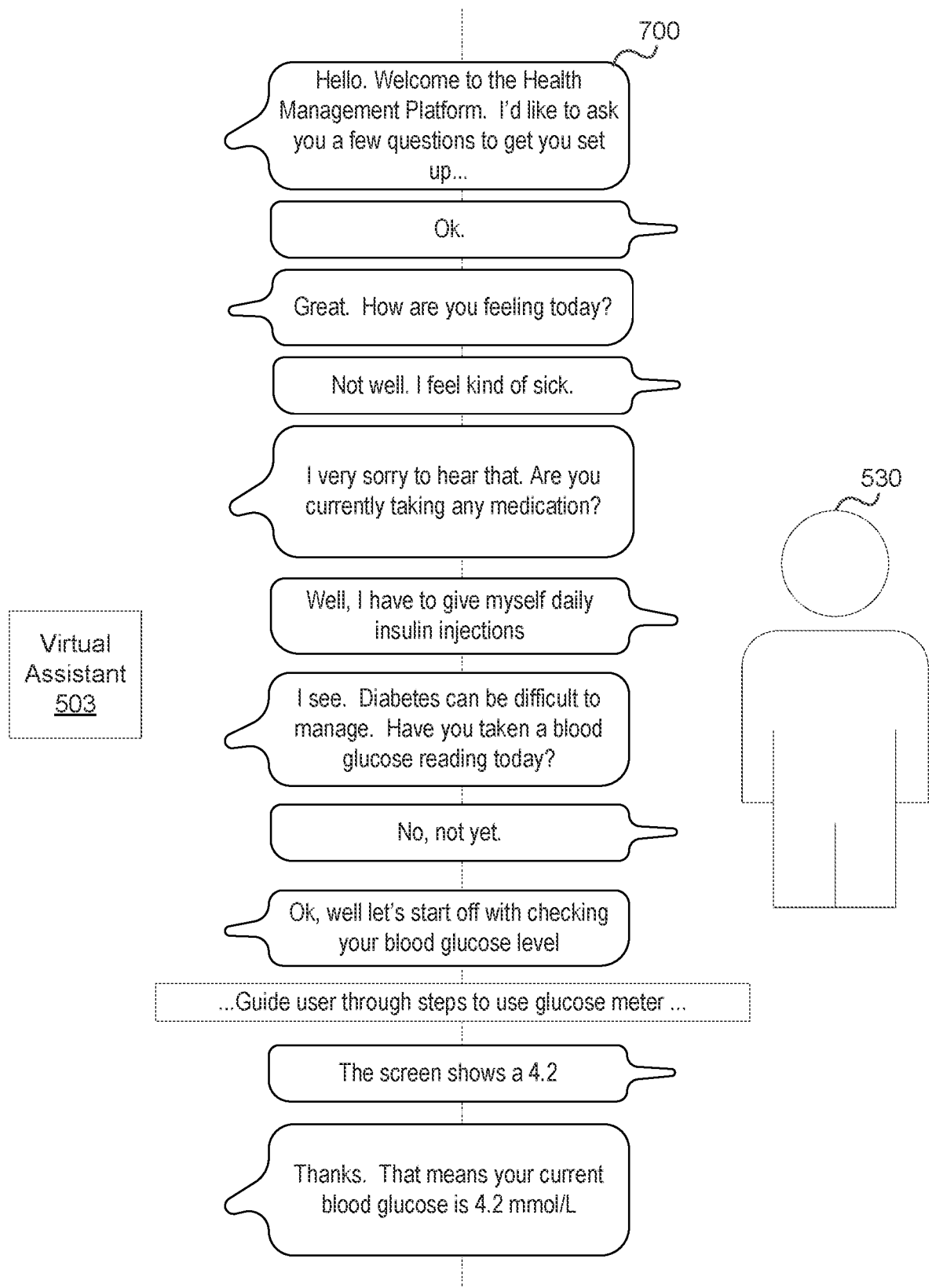
FIG. 7 shows another example audio-based natural language conversation between a virtual assistant and a user.

In some embodiments, the virtual assistant 503 may dynamically respond to replies by the user 530 when generating messages as part of a natural language conversation with the user. In other words, instead of following a rigid question and answer script, the conversation may flow naturally and move in different directions based on replies by the user. FIG. 7 depicts an example audio-based natural language conversation 700 between a virtual assistant 503 and a user 530 in which the virtual assistant 503 dynamically changes the direction of the conversation based on replies by the user. Specifically, FIG. 7 depicts an example conversation that may occur between the virtual assistant 503 and the user 530 when the user accesses the health management platform 502 for the first time and when the health management platform 502 therefore has very limited patient data associated with the patient. In the example conversation 700, the virtual assistant 503 begins with a simple greeting and indicates that they will go through a few questions (e.g., as part of a structured patient survey) to get the user 530 set up with the health management platform 502. However, before proceeding with the set of questions, the virtual assistant 503 first asks how the user 530 is feeling. The user's 530 response (that the user 530 is feeling sick) causes the virtual assistant to dynamically change the direction of the conversation and instead try to identify the reason that the user 530 is feeling sick. For example, the virtual assistant 503 may ask about what is bothering the user 530 or, as depicted in FIG. 7, ask if the user is on any medication.

In the example conversation 700 depicted in FIG. 7, the virtual assistant 503 is able to infer, based on received responses from the user 530, that the patient (in this case user 530) is diabetic. Such information may be added as a patient data associated with the patient. Further, with the knowledge that the patient is diabetic and not feeling well, the virtual assistant 503 may initiate a routine to obtain a most recent blood glucose level of the patient, for example, by guiding the user 530 through a sequence of steps similar to those depicted in FIG. 6 to obtain such data.

Figure 8:
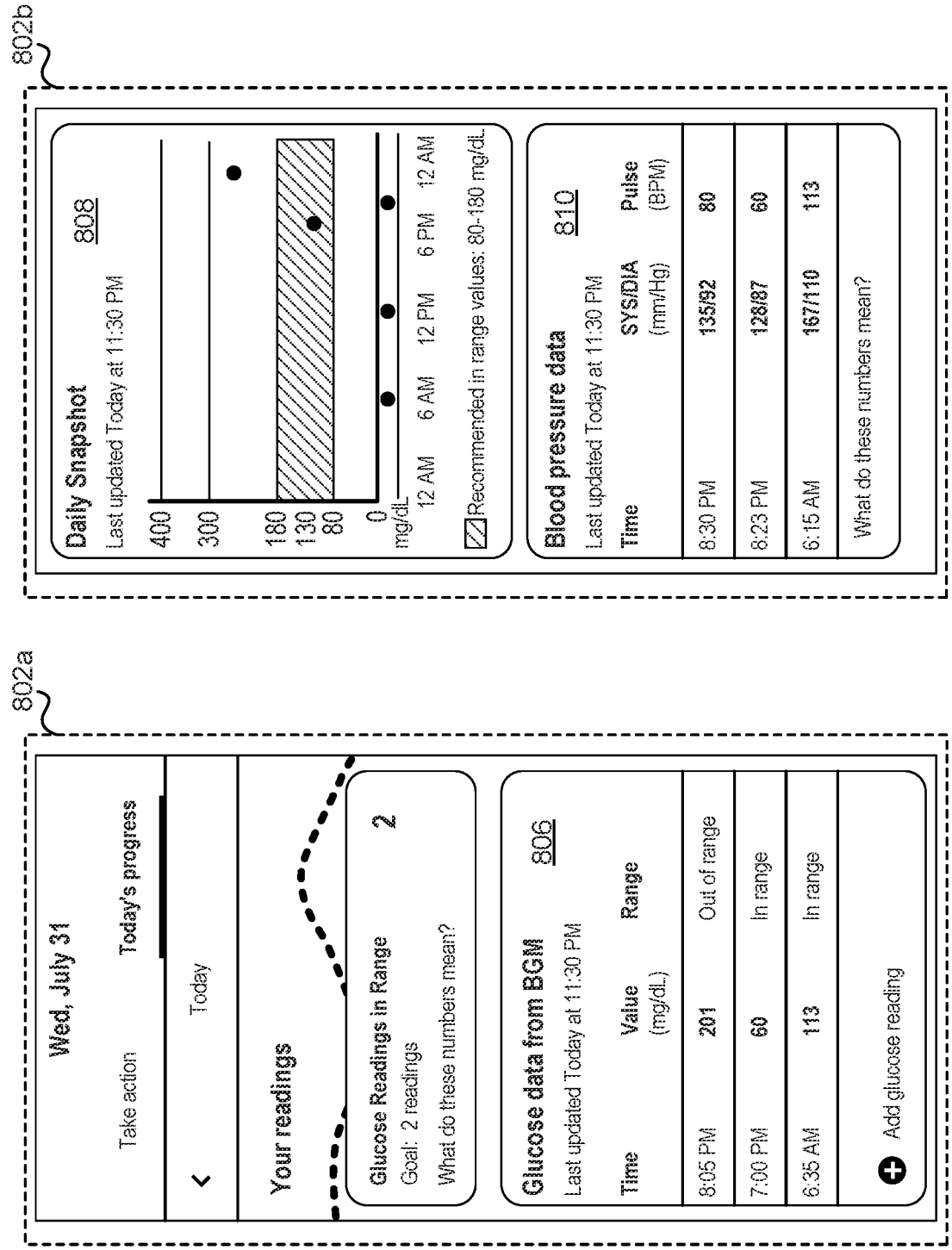
FIGS. 8-10 show example screens of an example graphical user interface associated with a health management platform.

In some embodiments, at least some of the patient data obtained through an audio-based patient survey process can be presented to a user, for example, via a GUI associated with a health management platform. FIG. 8 depicts example screens 802a-b of an example GUI associated with a health management platform (e.g., health management platform 102). The GUI may be part of an interface 104 associated with health management platform 102. As shown in FIG. 8, the example screens 802a-b depict various visual elements based on obtained patient data. Specifically, graphical element 804 indicates a number of blood glucose readings within a goal range, element 806 depicts a listing of the blood glucose readings including those out of range, element 808 depicts a chart of blood glucose readings over the past day and in relation to events such as meals and tracked exercise, and element 810 depicts a listing of blood pressure readings from a blood pressure monitor. One or more of the elements 804-810 may be generated for display in the GUI using patient data that was obtained using the introduced audio-based technique. In other words, without requiring direct access to health monitoring devices such as blood glucose monitors or blood pressure monitors and without passively waiting for the user to input such data via the GUI, the system may instead rely on a virtual assistant to engage in one or more natural language conversations with the user to obtain such patient data.

In some embodiments, patient data may be presented to the user in a way that indicates a staleness level or conversely a freshness level. As used herein, data "staleness" and/or "freshness" generally refers to how recent the data was collected and may be indicative of the usability of the data. The relative staleness of any given data point will depend on the type of data represented. For example, a data point indicating a height of an adult user will remain in a fresh state from months or even years as such data is not expected to change drastically. Conversely, a data point indicating a blood glucose level of the user may become stale several hours later as it is expected that such data will change rapidly. A staleness or freshness level of certain patient data can be visually indicated to the user via the GUI in number of different ways. For example, although not shown in FIG. 8, displays of certain data points may be color coded to visually indicate staleness level. As an illustrative example, a blood glucose reading may appear as green when first obtained (e.g., using the audio-based patient survey technique) but will gradually transition through a range of different colors throughout the day (e.g., yellow, orange, red, etc.) as the staleness level of the data increases. This visual indication may help reminded the user that updated patient data is needed.

The various GUI elements and recorded patient metrics depicted in FIG. 8 are examples provided for illustrative purposes and are not to be construed as limiting. Patient data may be presented, via a GUI, to the user in ways other than those depicted in FIG. 8.

Figure 9:
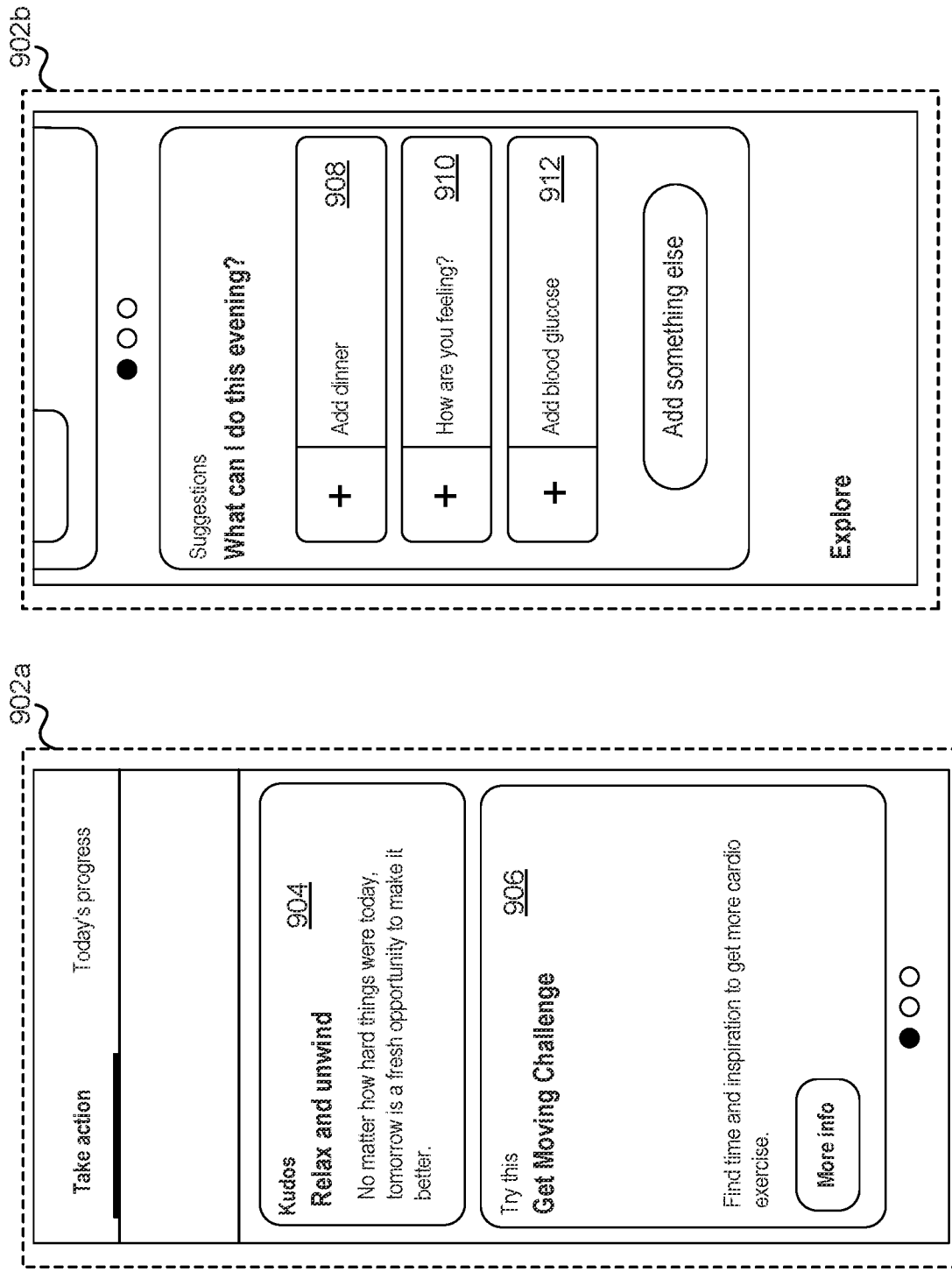

In some embodiments, at least some of the patient data obtained through an audio-based patient survey process can be utilized by a health management platform to present recommendations to a user that are configured to improve a health state of the user and thereby help manage the user's chronic health condition. Recommendations can include, for example, performing an action such as exercising, swapping a food item in a meal to adjust diet, tackling a challenge, using a health monitoring device to take a new reading, etc. Such recommendations may be presented to a user as audible messages, for example, via a speaker at a user computing device. Alternatively, or in addition, certain recommendations may be presented via a GUI. FIG. 9 depicts example screens 902a-b of an example GUI associated with a health management platform (e.g., health management platform 102). The GUI may be part of an interface 104 associated with health management platform 102. As shown in FIG. 9, the example screens 802a-b depict various interface elements which may represent recommended actions to a user of the platform.

Specifically, element 904 includes an encouraging message to the user that acknowledges the difficulty of the user's condition while encouraging the user to continue taking actions to effectively manage their condition.

Element 906 includes a recommendation to the user to accept a challenge that is administered via the health management platform. In the example depicted in FIG. 9, the challenge is an exercise challenge (e.g., walk 1 mile every day for a week); however, other such challenges may similarly be presented via the GUI. Other challenges may include, for example, food swap challenges to swap certain food items for healthier options (e.g., high sugar vs. low sugar, high carb vs. low carb, etc.), educational challenges to learn about more about certain chronic health conditions and effective techniques for managing such conditions, etc.

Elements 908, 910, and 912 are interactive elements for the user to perform one or more recommended quick actions. For example, by interacting with element 908, the user can perform a quick action to input what they are having for dinner, for example, by taking a picture of their dinner, selecting from one or more predefined options presented via the GUI, or participating in an audio-based natural language conversation with the virtual assistant. For example, in response to the user selecting element 908, the virtual assistant may initiate an audio-based patient survey conversation to inquire about what the user is planning on eating for dinner and, if necessary, make some suggestions for healthier alternatives. Similarly, in response to the user selecting element 912, the virtual assistant may initiate an audio-based patient survey conversation to guide the user through taking a blood glucose measurement, for example, as illustrated with respect to FIG. 7.

In any case, the GUI presented to the user may be configured based on patient data that is obtained, at least in part, using the introduced technique for audio-based patient surveys. For example, by processing patient data along with other input data obtained via a data pipeline 400, the health management platform may generate recommendations that are configured to improve the health of the user. As an illustrative example, if based on acquired patient data, the health management platform determines that the user's health state would improve through some exercise, the health management platform may present, via the GUI, a recommendation to participate in an exercise challenge (e.g., element 906). Similarly, if based on acquired patient data, the health management platform determines that the user's health state would improve through closer management of blood glucose levels, the health management platform may present, via the GUI, a recommendation to take another blood glucose reading (e.g., element 912).

The various GUI elements depicted in FIG. 9 are examples provided for illustrative purposes and are not to be construed as limiting. Recommendations may be presented, via a GUI, to the user in other ways than as depicted in FIG. 9.

Figure 10:
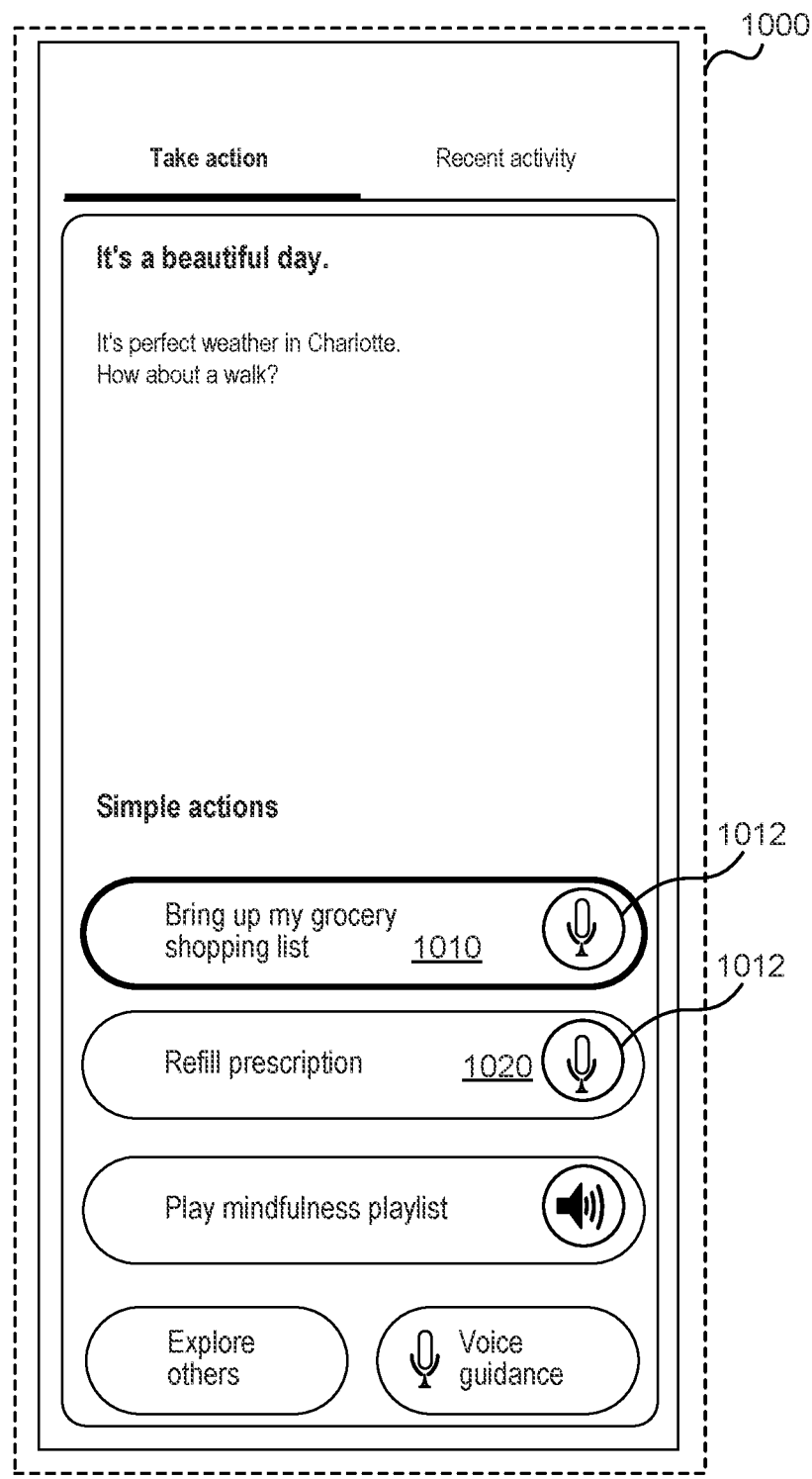

In some embodiments, certain interactive elements presented via a GUI may include options for audio-based interaction. For example, to assist users that may have difficulty utilizing certain interactive features via the GUI, such features may include options to instead participate in natural language conversation with a virtual assistant. FIG. 10 depicts an example screen 1000 of an example GUI associated with a health management platform (e.g., health management platform 102). The GUI may be part of an interface 104 associated with health management platform 102. As shown in FIG. 10, the example screen depicts various interactive elements that enable the user to perform quick actions to help manage a chronic health condition.

In the example depicted in FIG. 10, the GUI includes an interactive element 1010 for creating and editing a shopping list and an interactive element 1020 for refilling a prescription. In an example embodiment, in response to interacting with element 1010, the user may be presented with various GUI elements such as an editable text field that enables the user to input a shopping list and/or a menu that enables the user to select from a listing of available items. In some embodiments, this feature may be integrated with an ecommerce system associated with a grocery retailer to allow the user to have items on the list delivered. However, element 1010 also includes an option 1012 to instead access the functionality associated with element 1010 using audio-based interaction with a virtual assistant. For example, in response to selecting option 1012, the virtual assistant may initiate a natural language conversation with the user to discuss items that the user would like to purchase, suggest certain healthier options, and develop a shopping list for the user. The virtual assistant can then walk the user through the various steps to order the items online, direct the user to the nearest physical store to purchase the items, and/or order the items automatically on behalf of the user.

In the example depicted in FIG. 10, the GUI also includes an interactive element 1020 for refilling a prescription. In an example embodiment, in response to interacting with element 1020, the user may be presented with various GUI elements such as an editable text field that enables the user to input prescription information and/or a menu that enables the user to select from a listing of previous prescriptions for refill. In some embodiments, this feature may be integrated with a system associated with a pharmacy to allow the user to have a prescription refilled. However, element 1020 also includes an option 1022 to instead access the functionality associated with element 1020 using audio-based interaction with a virtual assistant. For example, in response to selecting option 1022, the virtual assistant may initiate a natural language conversation with the user to help the user identify what prescription needs to be refilled, suggest options to refill the prescription, and/or automatically submit a request to a pharmacy on behalf of the user.

The various GUI elements depicted in FIG. 10 are examples provided for illustrative purposes and are not to be construed as limiting. Options for utilizing audio-based interactions may be presented, via a GUI, to the user in other ways than as depicted in FIG. 10.

Figure 11:
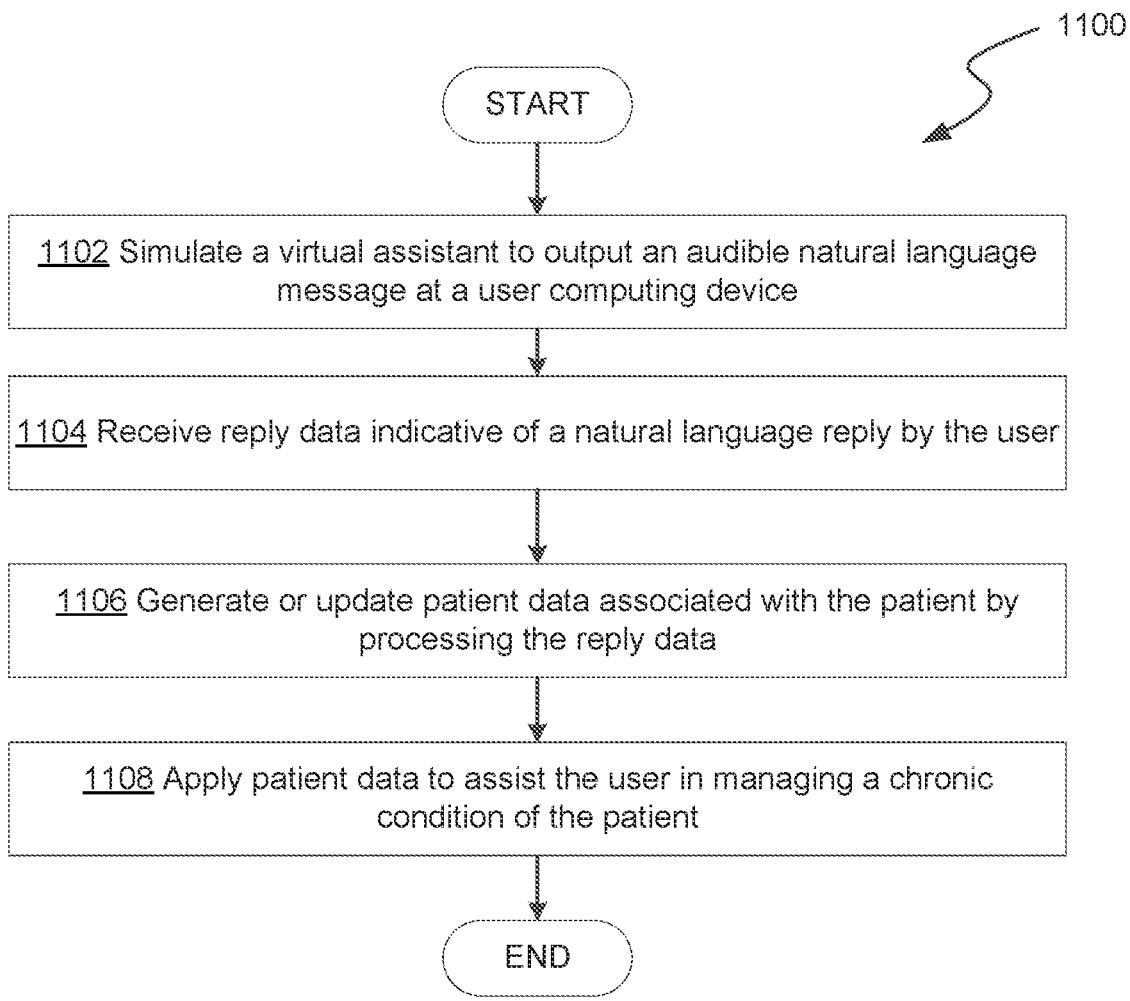
FIG. 11 shows a flow diagram of an example process for performing an audio-based patient survey to obtain patient data associated with a patient.

FIG. 11 shows a flow diagram of an example process 1100 for performing an audio-based patient survey to obtain patient data associated with a patient. In some embodiments, the example process 1100 may be performed by a computer system associated with a health management platform (e.g., health management platform 102 of FIG. 1).

Example process 1100 begins at operation 1102 with simulating an assistant (i.e., a virtual assistant) to participate in a natural language conversation with a user to obtain data associated with the user. For example, as previously discussed with respect to FIGS. 5-7, a simulated natural language conversation may include one or more natural language messages exchanged between the virtual assistant and a user of a health management platform. For example, with respect to FIG. 5, operation 1102 may include a virtual assistant 503 (or an associated computer program) generating a natural language message and transmitting a signal, via network 506, to a user computing device 510 that causes the user computing device to output, via a speaker 512, an audible version of the generated natural language message that is perceptible by the user 530.

In some embodiments, the message generated by the virtual assistant 503 includes a prompt for the user 530 to provide a natural language reply. In some embodiments, this prompt may be in the form of a question. For example, an audible natural language message output by the virtual assistant 503 in the scenario depicted in FIG. 5 includes a prompt stating, "[h]ave you measured your blood glucose this morning? What did you get?" This set of questions prompts the user 530 to reply with a blood glucose reading (assuming a measurement was taken).

In some embodiments, the message generated by the virtual assistant 503 includes a prompt for the user 530 to perform some type of action. For example, as described with respect to FIG. 6, a message by the virtual assistant 503 may include a prompt for the user to perform an action associated with taking a measurement using a health monitoring device. In some embodiments, the message by the virtual assistant 503 may include a prompt for the user 530 to perform an action before providing an audible natural language reply. For example, the message by the virtual assistant 503 may include a prompt for the user 530 to take a measurement using a health monitoring device (the action) and a prompt to recite a result of the measurement (the reply).

Example process 1100 continues at operation 1104 with receiving reply data indicative of a natural language reply by the user. In some embodiments, the reply data received at operation 1104 may include audio data indicative of an audible natural language reply by the user. For example, as previously discussed with respect to FIGS. 5-7, a user 530 may provide an audible natural language reply (i.e., a spoken reply) by speaking into a microphone 514 associated with the user computing device 510. The microphone 514 may capture the user's 530 voice and convert the sound of the user's voice into audio data, for example, by using audio circuitry and an audio codec. This audio data may then be transmitted, by the user computing device 510, via a network 506, to a computer system that is executing process 1100. Accordingly, the computer system may receive this audio data that is indicative of the audible natural language reply by the user 530.

In some embodiments, the reply data received at operation 1104 may include text data indicative of a typed text reply by the user. For example, in response to the prompt in the audible natural language message by the virtual assistant, the user may type a text-based reply using, for example, a GUI element such as an editable text field that is presented in a GUI 104 of the health management platform 102.

In some embodiments, the reply data received at operation 1104 may include selection data indicative of a selection, by the user, of a particular preset reply. For example, in response to the prompt in the audible natural language message by the virtual assistant, the user may select by using, for example, a GUI element such as a pull-down menu, a particular preset reply from a set of multiple preset replies.

In embodiments in which the reply data is not based on an audible reply by the user, example process 1100 may additionally include causing the user computing device to present an audible reading of the typed text reply or selected preset reply by the user. In this way, the system can provide audible feedback to the user so that the user can confirm that their reply is accurate.

Example process 1100 continues at operation 1106 with generating or updating patient data associated with the patient by processing the reply data received at operation 1104. As previously mentioned, patient data can include any type of data associated with a patient such as physiological data (e.g., measurements from a health monitoring device), fitness data (e.g., current activity state, number of laps run, etc.), indicator data (e.g., a name, an email address, or other distinctive information), demographic information (e.g., age, sex, nationality, etc.), or contextual data. In this context, "contextual data" associated with a patient can include, for example, information indicative of the chronic health condition of the patient (e.g., diabetes, arthritis, etc.), a health state (physical or mental) of the patient, a mood of the patient (happy, sad, etc.), an activity performed by the patient (e.g., sitting, running, etc.), a physical location of the patient (e.g., in Charlotte, at home, etc.), a weather condition at a physical location of the patient (e.g., sunny, raining, etc.), or any other type of information that provides context regarding the patient.

In some embodiments, operation 1106 may include processing reply data received at operation 1104 with other input data (e.g., other input data from a data pipeline 400). For example, a blood glucose level for a user that is determined based on an audible natural language reply by the user may be processed together with other input data such as images from a camera on the user computing device to determine contextual data (e.g., a health state) associated with the user. In this context, processing the multiple types of data "together" may refer to inputting the multiple types of data into a same model, rule, or processing pipeline to produce an output, but does not necessarily imply that the data are processed in parallel as opposed to serially. For example, reply data may be processed initially to produce a first intermediate output, and input data from a different source may be processed subsequently to produce a second intermediate output. The two intermediate outputs can then be compared, analyzed, or otherwise processed to produce a final output indicative of contextual data (e.g., a health state of the user). In some embodiments, processing the multiple types of data together may refer to processing the data concurrently with each other using a same model, rule, or processing pipeline. For example, reply data from an audio-based patient survey and input data from a different source (e.g., image data) may be both input into a machine learning model and processed using the machine learning model to generate patient data indicative of determined context of the patient.

When the reply data includes audio data (e.g., based on an audible natural language reply by the user 530), operation 1106 may include decoding audio data received from the user computing device 510 (e.g., using a codec) and analyzing the decoded audio data to identify semantic content and/or one or more linguistic, paralinguistic, and/or non-linguistic features in the audio data. Linguistic features refer to aspects of spoken communication that involve words. Examples of linguistic features include the word count of different n-grams, whether jargon/slang is used, etc. Paralinguistic features refer to those aspects of communication that do not involve speech. Paralinguistic features often add emphasis or shades of meaning to what an individual says. Example of paralinguistic features may include body language, gestures, facial expressions, micro expressions, etc. Non-linguistic features also refer to those aspects of spoken communication that do not involve words. Much like paralinguistic features, non-linguistic features can add emphasis or shades of meaning to what an individual says. Examples of non-linguistic features include tone, inflection, pitch, volume/loudness, speaking rate, shimmer, jitter, etc.

In some embodiments, analyzing the audio data may include applying a speech recognition algorithm to identify a string of words spoken by the user 530, applying NLP to extract meaning from the word or string of words, and any combination thereof. For example, in some embodiments, operation 1106 may include applying a codec to process audio data received at operation 1104 to generate a decoded audio data. Operation 1106 may further include processing the decoded audio data using a speech recognition algorithm to identify a word or string of words spoken by the user 530. In some embodiments, speech recognition may be performed by processing the decoded audio data using one or more voice-to-text machine learning models configured to output words or strings of words based on input audio data. Operation 1106 may further include processing the word or string of words using NLP to extract meaning associated with the user's reply. In some embodiments, NLP may be performed using one or more machine learning models configured to output semantic information indicative of an interpreted meaning of the user's reply based on an input word or string of words. In some embodiments, one or more machine learning models may be configured to perform both speech recognition (i.e., identifying words in audio data) and NLP (i.e., extracting meaning from the words). In other words, such a machine learning model may be configured to output semantic information based on input audio data.

The patient data associated with the patient can be generated or updated based on the semantic information extracted from the audio data of the user's 530 reply. For example, if the user's 530 reply states "sure, it was 4.2 at 8 a.m.," the extracted semantic information may indicate that the "4.2" value indicates a blood glucose level and that the "8" value indicates a time at which the "4.2" value was obtained. Accordingly, based on this semantic information, operation 1106 may either generate a new data point indicative of a blood glucose level of 4.2 mmol/L at 8:00 a.m. or may update a previous data point (e.g., 5.6 mmol at 6:00 a.m.).

In some embodiment operation 1106 may include analyzing the reply data to identify metadata associated with the reply data and generating the patient data based on the identified metadata. Metadata may include a time the reply data was received and/or input by the user, a geographical location where the reply data was input, a type of device used to input the reply data, a delay between outputting the audible natural language message by the virtual assistant and receiving the reply data, and/or any other pertinent metadata.

In some embodiments, operation 1106 can include processing reply data to determine a chronic health condition (e.g., diabetes) of a patient. Consider, for example, the scenario depicted in FIG. 6 in which a user's reply regarding insulin injections is analyzed to infer that the user is living with diabetes. In other words, a piece of patient data (e.g., that the patient self-injects insulin) is processed to determine contextual data regarding the patient (i.e., that the patient is diabetic) without receiving a reply by the user that expressly states that patient (in this scenario, the user) is diabetic. Such contextual data can be used, for example, by the virtual assistant to formulate a next message in the conversation and/or by the health management platform in general to reconfigure a GUI, recommend services, etc.

In some embodiments, operation 1106 can include processing reply data to determine a health state of the patient. The term "health state" can refer to physical health, mental health, emotional health, or any combination thereof. As an illustrative example, a physical health state for a diabetic patient may include a glycemic state determined from measured blood glucose levels determined using a glucose monitoring device and communicated by the user via a natural language conversation with a virtual assistant. In such an example, the health state may be defined categorically (e.g. low, normal, high, etc.) or in any other appropriate manner. As another example, a mental or emotional state for a patient may be determined by analyzing audio messages by the patient as part of a natural language conversation with a virtual assistant. For example, audio data based on a patient's voice captured by a microphone may be analyzed to identify features indicative of a defined mental or emotional state. Identified features used to determine a health state of the user may include linguistic features, non-linguistic features, and/or paralinguistic features.

In some embodiments, operation 1106 can include processing reply data to determine an activity of the patient. An activity of the patient may be determined by analyzing audio messages by the patient as part of a natural language conversation with a virtual assistant. For example, the content of a patient's message (e.g., a statement saying, "I am going for a jog") may be analyzed to determine that the patient is running or will soon be running. As another example, breathing characteristics (e.g., rate) by the patient captured in audio of a message by the patient can be analyzed to determine a current level of physical exertion by the patient.

In some embodiments, operation 1106 can include processing reply data to determine a physical location of the patient. A physical location of the patient may be determined by analyzing messages by the patient as part of a natural language conversation with a virtual assistant. For example, the content of a patient's message (e.g., a statement saying, "I am home") may be analyzed to determine a physical location of the patient. In some embodiments, such determinations may be confirmed using data from other sources such as location data from a GPS-equipped user computing device. For example, the user computing device may transmit GPS coordinates to a computer system of the health management platform 102. Location data (e.g., in the form of GPS coordinates) may be used to identify a physical locale or landmark corresponding to the patient's exact physical location. For example, by using received GPS coordinates, the system may determine that the patient is in a particular city (e.g., Charlotte), in a particular neighborhood, at a particular physical address, at a particular type of location (e.g., at home, a gym, or a doctor's office), etc.

In some embodiments, operation 1106 may include processing reply data to using one or more rules to generate patient data associated with the patient. For example, a rule may specify one or more keywords that, when detected in a message from a user, indicate some type of contextual information associated with a patient. As another example, a rule may specify that a patient's physical health state is normal if blood glucose levels communicated by the user in a conversation with the virtual assistant are within a predefined range. These are just some illustrative examples of rules that may be applied to patient data based on received reply data.

In some embodiments, operation 1106 may include processing reply data using one or more machine learning models to generate patient data associated with the patient. For example, a machine learning model may be trained to infer a physical health state of a patient based on physiological data associated with the patient obtained through a natural language conversation with a virtual assistant. In any case, the one or more machine learning models may apply one or more different processes to the data using various machine learning techniques such as decision trees, naïve Bayes classifiers, support-vector machines, random forests, artificial neural networks, etc.

In some embodiments, operation 1106 may include applying an identity resolution process to reply data by the user before associated certain patient data with a patient. As previously discussed, the user may be the patient or may be another individual with an interest in the care of the patient. Accordingly, in some embodiments, operation 1106 may include analyzing the reply data by the user, determining a relationship between the user and a specified patient, and associating generated patient data with the specified patient based on the determined relationship. For example, if an audible reply by the user indicates that the user is at home, the system may first analyze the audio to identify features of the user's speech (e.g., volume, inflection, word pronunciation, etc.). The identified features can then be compared to a voice print associated with the patient to determine whether the user that input the audio message is the patient. If, based on the comparison, it is determined that the user is the patient, then certain patient data (e.g., a physical location) can be associated with the patient.

In any case, patient data associated with the patient that is generated or updated at operation 1106 may be stored in any suitable data structure for use by various functionalities of a health management platform 102. For example, in some embodiments, the patient data generated or updated at operation 1106 may include one or more entries in a database containing patient data associated with the patient.

Example process 1100 concludes at operation 1108 with applying at least some of the patient data generated or updated at operation 1106 to assist the user in managing a chronic health condition of the patient such as diabetes. For example, as previously discussed, a health management platform (e.g., health management platform 102) may use data from various sources to provide services to a user that assist the user in managing a chronic health condition. Services can include, for example, displayed data, data analytics, recommended actions, educational information, tracked challenges, communication with clinicians or health coaches, etc.

In some embodiments, services are provided to a user via a GUI such as the example GUI described with respect to FIGS. 8-10. For example, in some embodiments, operation 1108 may include presenting at least some of the patient data generated at operation 1106 via a GUI such as depicted in FIG. 8. In some embodiments, operation 1108 may additionally include analyzing the patient data to generate analytics information and presenting such analytics via a GUI such as depicted in FIG. 8. In some embodiments, operation 1108 may include generating visualizations based on patient data and presenting such visualizations via a GUI such as depicted in FIG. 8 (e.g., element 808).

As alluded to previously (e.g., with respect to FIGS. 6-7) a natural language conversation between a user and a virtual assistant may include multiple exchanged messages. Accordingly, although not expressly stated in FIG. 11, in some embodiments, the audible natural language message by the virtual assistant 503 may be one of multiple natural language messages presented to the user 530. For example, in some embodiments, an audible natural language message by the virtual assistant 503 may be one message in a sequence of messages that guide the user to perform a sequence of actions. The sequence of actions may be associated, for example, with obtaining a measurement from a health monitoring device, administering a medication, performing an exercise, contacting a clinician or health coach, utilizing a service of the health management platform, swapping a food item in a meal, etc. In other words, in some embodiments, the natural language conversation may additionally include a second subsequent message by the virtual assistant after receiving the audio data indicative of the user's 530 reply at operation 1104. In some embodiments, this subsequent message by the virtual assistant 503 may be based on the patient data generated or updated at operation 1106. For example, in response to determining, based on a reply by a user 530, a measured value such as blood glucose level, the virtual assistant may generate and present a subsequent audible natural language message including a prompt for the user to confirm the units associated with the communicate value.

Figure 12:
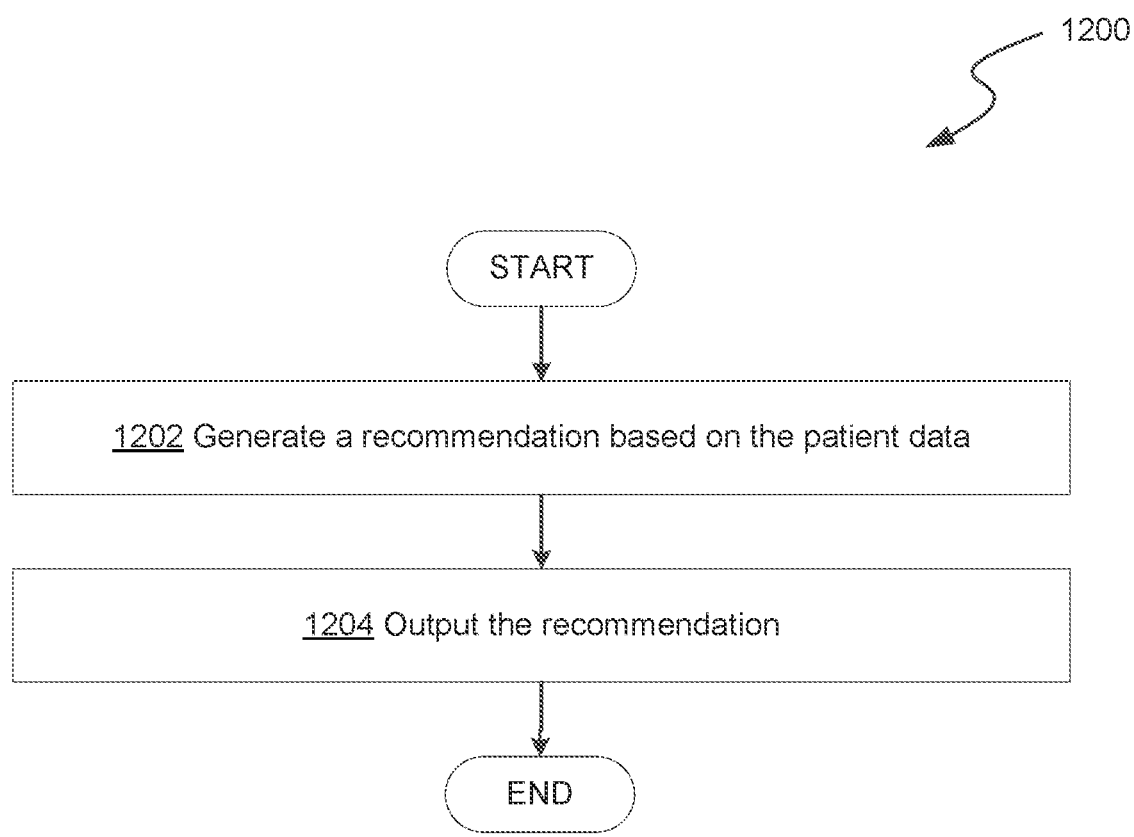
FIG. 12 shows a flow chart of an example process for using patient data to generate and present recommendations to improve a health state of a patient.

In some embodiments, operation 1108 may include processing the patient data and generating one or more recommendations that are configured to improve the overall health of the patient as part of a process of managing the patient's chronic health condition. FIG. 12 shows a flow chart of an example process 1200 for using patient data to generate and output recommendations to improve a health state of a patient. In some embodiments, example process 1200 may represent a sub-process of operation 1108 in example process 1100.

Example process 1200 begins at operation 1202 with generating a recommendation based on the patient data generated, for example, at operation 1106 in example process 1100. In some embodiments, such recommendations may be configured to improve a health state of a patient to assist the patient in managing a chronic health condition. Recommendations can be for the patient to perform some type of action, such as using a health monitoring device to obtain an updated measurement, performing a fitness activity, swapping a first food item for a healthier second food item in a meal, accessing educational information (e.g., provided via the health management platform), accessing other services associated with the health management platform (e.g., structured challenges), etc.

In some embodiments, generating a recommendation at operation 1202 may first include determining that some contextual data associated with the patient does not satisfy a specified criterion. For example, in some embodiments, operation 1202 may include determining that a health state of the patient does not satisfy a specified criterion, thereby indicating that action should be taken to improve the health state of the patient and generating a recommendation to encourage, induce, or otherwise cause the patient to perform such an action. In some embodiments, determining whether the health state of the patient satisfies a specified criterion may include determining whether a quantified measure indicative of the health state meets or exceeds a threshold value or is within a specified range. For example, a health state of the patient may be indicated by a quantified metric such as blood glucose level. In such an example, the health state of the patient may satisfy a specified criterion if the blood glucose level is within a specified normal range. If the blood glucose level is outside the range (i.e., above a maximum value or below a minimum value), then the specified criterion is not satisfied, and action may need to be taken to improve the health state of the patient.

In some embodiments, generating a recommendation at operation 1202 may include identifying a predefined activity that is known or likely to improve the health state of the patient in response to determining that the health state of the patient does not satisfy the specified criterion. The type of predefined activity will differ depending on the type of health state of the patient and the type of chronic health condition of the patient. Examples of predefined activities that may improve the health state of the patient include using a health monitoring device to acquire updated physiological data, performing a fitness activity (i.e., exercising), performing a food swap activity (i.e., swapping a food item for a healthier alternative), consulting a health expert (e.g., calling or visiting a doctor), taking a medication, performing a mindfulness activity (e.g., meditating), etc.

In some embodiments, one or more rules may be applied to identify an activity that will improve a health state of the patient. For example, various data indicative of the health state of the patient may be processed using one or more rules to select a particular predefined activity (e.g., exercise) from a database of multiple predefined activities. In some embodiments, one or more machine learning models may be applied to identify an activity. For example, the various data indicative of the user's health state may be fed into one or more trained machine learning models to generate an output indicating a selection of a particular predefined activity (e.g., exercise) from a database of multiple predefined activities.

In some embodiments, generating the recommendation at operation 1202 may include processing patient data associated with the patient data to generate recommendation ranking values for one or more candidate recommendations. The candidate recommendations may include predefined activities such as taking a health measurement, swapping a food item, performing a fitness activity, consulting with a clinician or health coach, accessing a particular service of the health management platform 102, or any other predefined activities. In such embodiments, the patient data may be input into a scoring engine that is configured to generate and output a recommendation ranking value associated with each candidate recommendation. The scoring engine may apply one or more deterministic rules to generate the recommendation ranking values. Alternatively, or in addition, the scoring engine may apply probabilistic machine learning techniques to generate the recommendation ranking values. Examples of techniques that can be applied by the scoring engine include decision trees, directed graphs (acyclical or not), Naïve Bayes classifiers, support vector machines, random forests, artificial neural networks, etc. The recommendation ranking values generated by the scoring engine can include numerical values and or categorical values. Numerical values may include, for example, a value from 0 to 100 with 0 representing a lowest recommendation rank and 100 representing a highest recommendation rank. Categorical values may include values split into categories such as "not recommended," "neutral," and "recommended." These are just example recommendation ranking values and are not to be construed as limiting. The type of recommendation ranking value applied may depend on the type of scoring technique applied by the scoring engine.

Once the recommendation ranking values are generated, operation 1202 may include identifying, based on the recommendation ranking values, one or more of candidate recommendations that satisfy a specified recommendation criterion. A specified recommendation criterion may be based, for example, on a specified threshold recommendation ranking value. For example, any candidate recommendation associated with a recommendation ranking value at or above the specified threshold may be identified as satisfying the specified recommendation ranking criterion. In some embodiments, the recommendation ranking criterion may be specified by a user (e.g., an administrative user) of the health management platform 102. In some embodiments, the recommendation ranking criterion may be automatically set and dynamically updated by a computer system associated with the health management platform 102. For example, in some embodiments, the recommendation ranking criterion may dynamically change in response to detected changes in the patient data associated with the patient.

Example process 1200 concludes at operation 1204 with outputting any recommendations generated at operation 1202.

Outputting the recommendation at operation 1204 may include presenting the recommendation to the user. In some embodiments, the recommendation may be presented as a text message transmitting, for example, via a GUI of the health management platform 102 or via some other communications channel such as email or SMS.

In some embodiments, the recommendation may be presented as part of the natural language conversation between the virtual assistant and the user. In such an embodiment, presenting the recommendation may include generating a natural language message that includes or is otherwise indicative of the recommendation and transmitting a signal (e.g., via a computer network) to the user computing device that causes the user computing device to output, via a speaker, an audible natural language message indicative of the recommendation. For example, if the recommendation is to exercise, the virtual assistant may generate and present an audible natural language message such as "how about a quick walk around the block?" As another example, the conversation 700 depicted in FIG. 7 includes a message by the virtual assistant stating " . . . let's start off with checking your blood glucose level." This message may represent a presentation of a generated recommendation to take a new blood glucose reading.

In some embodiments, the recommendation may be presented in the form of a graphical element in a GUI associated with a health management platform (e.g., health management platform 102). In such embodiments, operation 1206 may include generating a graphical element indicative of the recommendation and dynamically updating display of the GUI to include the generated graphical element. Examples of graphical elements indicative of generated recommendations include elements 906, 908, 910, and 912 shown in FIG. 9. In some embodiments, the GUI including the recommendation is presented via a display of the same user computing device through which the audio is output and captured as part of the natural language conversation between the virtual assistant and the user. For example, if the user computing device is a smartphone, a graphical element indicative of the recommendation can be presented in a GUI displayed at the smartphone. Alternatively, or in addition, the GUI including the recommendation can be presented at a different user computing device. For example, if the user is communicating with the virtual assistant via a smart microphone/speaker device that does not include an integrated display (e.g., an Amazon Echo™), the GUI can be presented via a second user computing device such as a smartphone associated with the user.

In some embodiments, outputting the recommendation at operation 1204 may include presenting the recommendation a different user other than the user participating in the natural language conversation with the virtual assistant. For example, if the user participating in the natural language conversation with the virtual assistant is the patient, operation 1204 may include presenting the recommendation to a different user such as a family member of the user, a caretaker of the user, a clinician, or a health coach. In such embodiments, operation 1204 may include transmitting, via computer network, a signal to a user computing device associated with the other user that causes that user computing device to output, a text message indicative of the recommendation, an audible natural language message indicative of the recommendation, or a graphical element in a GUI that is accessible to the other user.

In some embodiments, outputting the recommendation may include communicating the recommendation to one or more different services associated with the health management platform 120 or one or more third-party services. For example, the recommendation may be communicated to a virtual sidekick or virtual health coach associated provided by the health management platform to modify the behavior of the virtual sidekick or virtual health coach to encourage the patient to take actions consistent with the recommendation.

In some embodiments, an audio-based patient survey according to the introduced technique can be initiated in response to a request by the user. For example, the process 1100 depicted in FIG. 11 may include an additional operation of receiving a signal from a user computing device that is indicative of a request to initiate an interactive audio-based patient survey. In such an embodiment, an initial audible natural language message by the virtual assistant may be generated and presented to the user in response to receiving the signal. The request by the user may include, for example, the user speaking a command into a speaker of the user computing device. Alternatively, or in addition, the request by the user may be based on user interaction with a GUI element such as elements 1012 or 1022 in FIG. 10.

In some embodiments, an audio-based patient survey according to the introduced technique can instead be initiated automatically without any input by the user. In other words, an initial audible natural language message associated with a simulated conversation may be generated and output by a virtual assistant automatically without any input by the user. For example, the virtual assistant may be configured to automatically initiate audio-based patient surveys with the user periodically (e.g., once every day or every week) to ensure that patient data is kept up to date.

Figure 13:
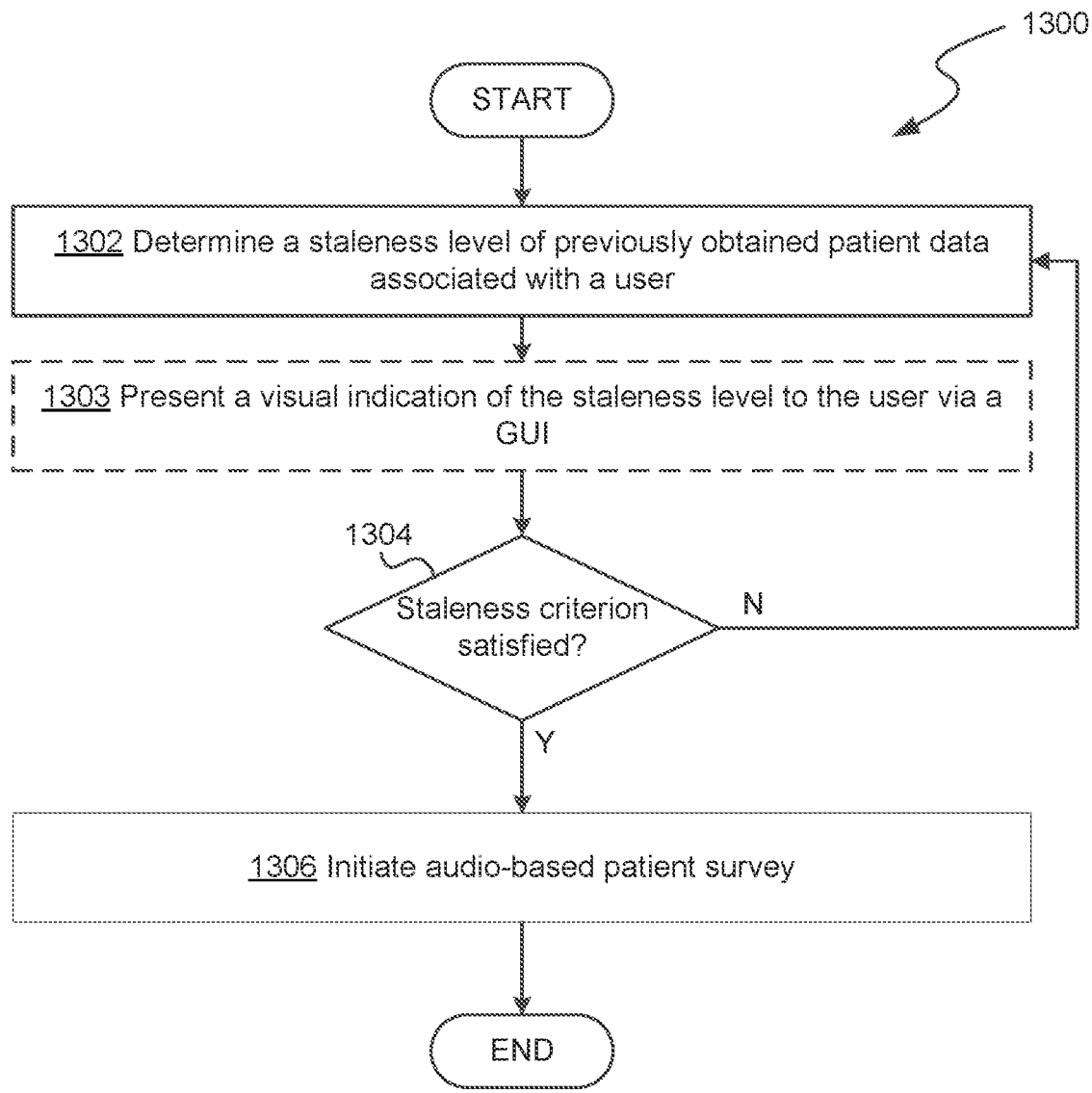
FIG. 13 shows a flow chart of an example process for initiating an audio-based patient survey based on a detected staleness level of previously obtained patient data.

Alternatively, or in addition, the virtual assistant may be configured to automatically initiate an audio-based patient survey when some condition is satisfied (or not satisfied). FIG. 13 shows a flow chart of an example process 1300 for initiating an audio-based patient survey based on a detected staleness level of previously obtained patient data.

Example process 1300 begins at operation 1302 with determining a staleness level (or conversely a freshness level) associated with previously obtained patient data. Recall that a staleness level of data may refer to how recently the data was collected and may be indicative of the usability of the data. The relative staleness of any given data point will depend on the type of data represented. For example, a data point indicating a height of an adult user will remain in a fresh state for months or even years as such data is not expected to change drastically. Conversely, a data point indicating a blood glucose level of the user may become stale several hours later as it is expected that such data will change rapidly.

In some embodiments, operation 1302 may include applying one or more rules to a given portion of patient data to determine a staleness level of that data. For example, a given rule may specify that a blood glucose reading is fresh (i.e., not stale) for up to three hours after taking the reading, becomes moderately stale after three hours, and becomes fully stale after twelve hours. Accordingly, operation 1302 may include comparing a timestamp associated with a portion of patient data to a current time, determining an elapsed time since the patient data was obtained, comparing the determined elapsed time to one or more threshold values associated with a data staleness rule, and determining a staleness level of the previously obtained patient data based on the comparison.

In some embodiments, example process 1300 optionally continues at operation 1303 with presenting a visual indication of the staleness level to the user, for example, via a GUI associated with a health management platform. For example, displays of certain data points in the GUI may be color coded to visually indicate staleness level. As an illustrative example, a blood glucose reading may initially appear as green when first obtained (e.g., using the audio-based patient survey technique) but gradually transition through a range of different colors throughout the day (e.g., yellow, orange, red, etc.) as the staleness level of the data increases. This is just an example of how a staleness level may be visually indicated. Other examples may include displaying a quantified stateless score alongside displayed patient data, displaying a symbol alongside displayed patient data (e.g., a "check mark" for fresh data and/or an "exclamation mark" for stale data), applying a visual transformation (e.g., blur) to a graphical element displaying the patient data, or any other suitable visual indication of a level of staleness.

Example process 1300 continues at decision 1304 with determining whether the staleness level determined at operation 1302 satisfies a specified staleness criterion. For example, a staleness criterion may specify a threshold staleness level. If the staleness level determined at operation 1302 is at or above the specified threshold, the staleness criterion is satisfied, and if the staleness level is below the specified threshold, the staleness criterion is not satisfied.

If the staleness criterion is not satisfied, example process 1300 may end without any additional operations or may return to operation 1302 to reevaluate the staleness level of the patient data at a later time.

If the staleness criterion is satisfied, operation 1300 may continue to operation 1306 with initiating an audio-based patient survey process (e.g., as described with respect to example process 1100 in FIG. 11) in response to determining that the staleness criterion is satisfied.

Computer System

Figure 14:
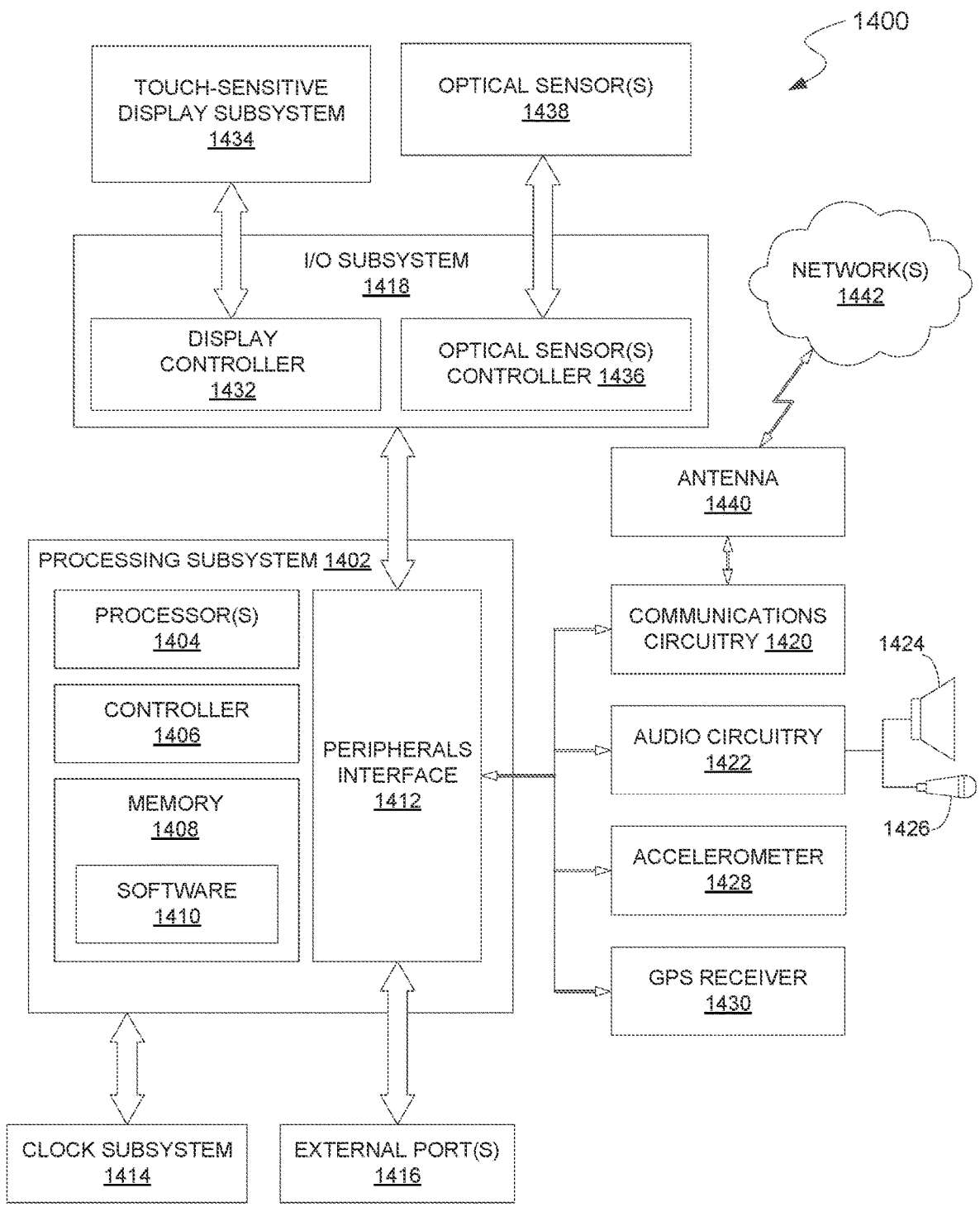
FIG. 14 shows a block diagram of an example computer system in which aspects of the disclosed technique can be implemented.

FIG. 14 is a block diagram illustrating an example computer system 1400 in which aspects of the disclosed technique can be implemented. In some embodiments, the computer system 1400 may represent or be a part of a user computing device (e.g., a smartphone) through which a user may access certain functionalities of a health management platform (e.g., health management platform 102). In some embodiments, computer system 1400 may represent or be a part of one or more computer devices that host the health management platform. The computer system 1400 may include generic components and/or components specifically designed to implement the disclosed technique. The computer system 1400 may be a standalone device or part of a distributed system that spans multiple networks, locations, machines, or combinations thereof. For example, components of the computer system 1400 may be included in or coupled to a system-on-chip (SOC), a single-board computer (SBC) system, a desktop or laptop computer, a smartphone, a kiosk, a mainframe, a mesh of computer systems, or combinations thereof.

In some embodiments, the computer system 1400 can operate as a server device or a client device in a client-server network environment, or as a peer machine in a peer-to-peer system. In some embodiments, the computer system 1400 may perform one or more steps of the disclosed embodiments in real-time, near real-time, offline, by batch processing, or combinations thereof.

The computer system 1400 includes a processing subsystem 1402 that includes one or more processors 1404 (e.g., central processing units (CPUs), graphical processing units (GPUs), application specific integrated circuits (ASICs), and/or field programmable gate arrays (FPGAs)), a memory controller 1406, memory 1408 that can store software 1410, and a peripherals interface 1412. The memory 1408 may include volatile memory (e.g., random-access memory (RAM)) and/or non-volatile memory (e.g., read-only memory (ROM)). The memory 1408 can be local, remote, or distributed. In some embodiments, memory 1408 may also include a data storage device such as a hard disk drive (HDD), a solid state drive (SSD), a removable drive (e.g., compact disc (CD)), etc. Memory 1408 may sometimes be referred to as a "computer-readable medium," a "machine-readable medium," and/or a "storage medium." While the memory 1408 is shown to be a single medium, the terms "computer-readable medium," "machine-readable medium," and "storage medium" should be taken to include a single medium or multiple media (e.g., a centralized/distributed database and/or associated caches and servers) that store one or more modules of software including one or more sets of instructions that are executable by the processors 1404.

The computer system 1400 can also include a clock subsystem 1414 that controls a timer for use in some embodiments. The components of the computer system 1400 are interconnected over a bus (not shown) operable to transfer data between hardware components. The bus can include a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"), or any other appropriate bus for data transfer between components.

The peripherals interface 1412 is coupled to one or more external ports 1416 which can connect to an external power source, for example. The peripherals interface 1412 is also coupled to an I/O subsystem 1418. Other components coupled to the peripherals interface 1412 include communications circuitry 1420, audio circuitry 1422 for a speaker 1424 and a microphone 1426, an accelerometer 1428, a GPS receiver 1430 (or global navigation satellite system (GLONASS) or other global navigation system receiver), and other sensors (not shown). The GPS receiver 1430 is operable to receive signals concerning the geographic location of the computer system 1400. The accelerometer 1428 can be operable to obtain information concerning an orientation of the computer system 1400.

The I/O subsystem 1418 includes a display controller 1432 operative to control a touch-sensitive display system 1434, which further includes the touch-sensitive display of the computer system 1400. The I/O subsystem 1418 also includes an optical sensor(s) controller 1436 for one or more optical sensors 1438 of the computer system 1400. The I/O subsystem 1418 includes other components (not shown) to control physical buttons.

The communications circuitry 1420 may be part of a network adapter that enables the computer system 1400 to mediate data over networks 1442 (e.g., networks 106*a*-*b* of FIG. 1) with an entity that is external to the computer system 1400 through any communication protocol supported by the computer system 1400 and the external entity. The communications circuitry 1420 can include a network adaptor card, a wireless network interface card, a router, an access point, a wireless router, a switch, a multilayer switch, a protocol converter, a gateway, a bridge, a bridge router, a hub, a digital media receiver, a repeater, or any other components for wired or wireless communication with another entity over networks 1442.

In some embodiments, the communications circuitry 1420 can configure an antenna 1440 of the computer system 1400. In some embodiments, the antenna 1440 is structurally integrated with the computer system 1400 (e.g., embedded in the housing or display screen) or coupled to the computer system 1400 through the external ports 1416. The communications circuitry 1420 can convert electrical signals to/from electromagnetic signals that are communicated by the antenna 1440 to networks 1442 (e.g., networks 106*a*-*b* of FIG. 1) or other devices. For example, the communications circuitry 1420 can include radio frequency (RF) circuitry that processes RF signals communicated by the antenna 1440.

The communications circuitry 1420 can include circuitry for performing well-known functions such as an RF transceiver, one or more amplifiers, a tuner, oscillators, a digital signal processor, a codec chipset, a subscriber identity module (SIM card or eSIM), and so forth. The communications circuitry 1420 may communicate wirelessly via the antenna 1440 with the networks 1442 (e.g., the Internet, an intranet and/or a wireless network, such as a cellular network, a wireless local area network (LAN) and/or a metropolitan area network (MAN)) or other devices.

The software 1410 can include an operating system (OS) software program, application software programs, and/or other software modules (e.g., communication module 304, GUI module 306, processing module 308, virtual assistant module 310, storage modules 312 of FIG. 3). A software program, when referred to as "implemented in a computer-readable storage medium," includes computer-readable instructions stored in the memory (e.g., memory 1408). A processor (e.g., processor 1404) is "configured to execute a software program" when at least one value associated with the software program is stored in a register that is readable by the processor. In some embodiments, routines executed to implement the disclosed embodiments may be implemented as part of OS software (e.g., Microsoft Windows and Linux) or a specific software application, component, program, object, module, or sequence of instructions referred to as "computer programs."

Computer programs typically comprise one or more instructions set at various times in various memory devices of the computer system 1400, which, when read and executed by the processor 1404, will cause the computer system 1400 to execute functions involving the disclosed embodiments (e.g., operations associated with the processes of FIGS. 11-13). In some embodiments, a carrier containing the aforementioned computer program product is provided. The carrier is one of an electronic signal, an optical signal, a radio signal, or a non-transitory computer-readable storage medium (e.g., the memory 1408).

Operation of the memory 1408, such as a change in state from a binary one (1) to a binary zero (0) (or vice versa) may comprise a visually perceptible physical change or transformation. The transformation may include a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

The computer system 1400 may include other components that are not shown or further discussed herein for the sake of brevity. One having ordinary skill in the art will understand any hardware and software that is included but not shown in FIG. 14. While embodiments have been described in the context of fully functioning computing devices, those skilled in the art will appreciate that the various embodiments are capable of being distributed as a program product in a variety of forms and that the disclosure applies equally, regardless of the particular type of machine or computer-readable media used to actually effect the embodiments.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method performed by a health management platform, the method comprising:
    accessing patient data that includes a set of datapoints for a tracked metric of a patient;
    comparing a timestamp of a most recently collected datapoint to a current time;
    determining an elapsed time based on the comparison of the timestamp to the current time;
    comparing the elapsed time to one or more threshold values associated with a staleness rule;
    in response to a determination that the elapsed time does not satisfy a staleness criterion based on an outcome of said comparing, reevaluating staleness of the patient data at a later time;
    in response to a determination that the elapsed time does satisfy the staleness criterion based on an outcome of said comparing, executing a computer program for simulating a virtual assistant that initiates a natural language conversation with a user to obtain data associated with the patient,
        wherein the natural language conversation includes an audible natural language message to be output at a user computing device associated with the user, and wherein the audible natural language message includes a prompt for the user to provide a natural language reply that is representative of either an audible response or a textual response and is recorded by the user computing device;
    receiving, from the user computing device, reply data indicative of the natural language reply by the user;
    applying, to the reply data, a machine learning model that is trained to interpret natural language conversations using interaction data related to past interactions between patients and health professionals, so as to obtain semantic information;
    establishing a new datapoint for the tracked metric based on the semantic information;
    updating the patient data associated with the patient by adding the new datapoint to the set of datapoints for the tracked metric; and
    generating, based on the patient data, a recommendation to improve a health state of the patient.

2. The method of claim 1, wherein the user is any of the patient, a caretaker, a clinician, or a health coach.

3. The method of claim 1, further comprising:
    causing the user computing device to output a second audible natural language message indicative of the recommendation.

4. The method of claim 1, further comprising:
    communicating the recommendation to a virtual health coach.

5. The method of claim 1, wherein the reply data includes:
    audio data indicative of the audible response by the user; and/or
    text data indicative of the textual response by the user.

6. The method of claim 1, wherein the reply data includes audio data indicative of the audible response by the user, and wherein the method further comprises:
    decoding the audio data using an audio codec; and
    applying a speech recognition process to identify one or more words spoken by the user in the natural language reply.

7. The method of claim 1, wherein the reply data includes audio data indicative of the audible response by the user, wherein the method further comprises:
    analyzing the audio data to identify one or more linguistic, paralinguistic, or non-linguistic features in the audio data;
    wherein the patient data is generated or updated based on the identified one or more linguistic, paralinguistic, or non-linguistic features.

8. The method of claim 1, wherein generating or updating the patient data further includes:
    analyzing the reply data to identify metadata associated with the reply data, wherein the metadata is indicative of any one or more of:
        a time the reply data was received and/or the natural language reply was input by the user,
        a geographic location where the natural language reply was input by the user;
        a type of device used to input the natural language reply, or
        a delay between outputting the audible natural language message and receiving the reply data;
    wherein the patient data is generated or updated based on the metadata.

9. The method of claim 1, wherein the audible natural language message further includes a prompt for the user to perform an action before providing the natural language reply.

10. The method of claim 9, wherein the action is to obtain a measurement from a health monitoring device, and wherein the natural language reply by the user is indicative of the obtained measurement.

11. The method of claim 1, wherein the audible natural language message is one in a sequence of a plurality of audible natural language messages that guide the user to perform a sequence of actions.

12. The method of claim 1, wherein the natural language conversation further includes a second audible natural language message generated by the computer program, based on the patient data, for outputting at the user computing device, the second audible natural language message including a prompt for the user to provide a second natural language reply.

13. The method of claim 1, further comprising:
receiving a request from the user computing device to initiate an interactive audio-based patient survey;
wherein the audible natural language message is generated by the computer program for outputting at the user computing device in response to the request.

14. The method of claim 1, wherein the audible natural language message is generated by the computer program for outputting at the user computing device automatically without any input by the user.

15. The method of claim 1, further comprising:
determining a staleness level of previously obtained patient data; and
determining that the staleness level of the previously obtained patient data satisfies a staleness criterion;
wherein the audible natural language message is generated by the computer program for outputting at the user computing device automatically in response to determining that the staleness level of the previously obtained patient data satisfies the staleness criterion.

16. The method of claim 1, wherein generating or updating the patient data further includes:
determining the health state of the patient based on the reply data.

17. The method of claim 1, wherein the recommendation is to perform an activity that includes any of:
using a health monitoring device to obtain an updated measurement;
performing a fitness activity; or
swapping a first food item for a second food item in a meal.

18. The method of claim 1,
wherein the reply data includes audio data indicative of the audible response by the user,
wherein the method further comprises:
decoding the audio data using an audio codec, and
applying a speech recognition process to the decoded audio data to identify one or more words spoken by the user in the natural language reply, and
wherein the machine learning model parses the one or more words to interpret a meaning that is indicative of the semantic information.

19. The method of claim 1,
wherein the natural language conversation is one of multiple natural language conversations conducted with the user over an interval of time, and
wherein the method further comprises:
aggregating recorded interactions involving the patient into a dataset; and
training the machine learning model using the dataset, so as to gain insights into effectiveness of different modes of simulated natural language conversations.

20. A health management computer system comprising:
a processor; and
a memory that includes instructions that, when executed by the processor, cause the health management computer system to:
access patient data associated with a patient;
compare a timestamp of a most recently added portion of the patient data to a threshold that is representative of a staleness criterion;
in response to a determination that the timestamp does not satisfy the staleness criterion, reevaluate staleness of the patient data at a later in response to a determination that the timestamp does satisfy the staleness criterion, execute a computer program for simulating a virtual assistant to participate in a natural language conversation with a user to obtain data associated with a patient,
wherein the natural language conversation includes an audible natural language message to be output at a user computing device associated with the user, and
wherein the audible natural language message includes a prompt for the user to provide a natural language reply that is representative of either an audible response or a textual response;
receive, from the user computing device, reply data indicative of the natural language reply by the user;
applying, to the reply data, a machine learning model that outputs semantic information indicative of an interpreted meaning of the natural language reply;
update the patient data associated with the patient based on the semantic information; and
generate, based on the patient data, a recommendation to improve a health state of the patient.

21. A non-transitory computer-readable medium with instructions stored thereon that, when executed by a health management computer system, cause the health management computer system to perform operations comprising:
accessing patient data associated with a patient;
comparing a timestamp of a most recently added portion of the patient data to a threshold that is representative of a staleness criterion;
in response to a determination that the timestamp does not satisfy the staleness criterion, reevaluating staleness of the patient data at a later time:
in response to a determination that the timestamp does satisfy the staleness criterion, executing a computer program for simulating a virtual assistant to participate in a natural language conversation with a user to obtain data associated with a patient,
wherein the natural language conversation includes an audible natural language message to be output at a user computing device associated with the user, and
wherein the audible natural language message includes a prompt for the user to provide a natural language reply that is representative of an audible response;
receiving, from the user computing device, audio data indicative of the natural language reply by the user;
decoding the audio data using an audio codec;
applying, to the decoded audio data, a machine learning model that performs speech recognition to identify one or more words in the audio data and natural language processing to extract meaning from the one or more words;
updating the patient data associated with the patient based on the one or more words and/or the meaning output by the machine learning model; and generating, based on the patient data, a recommendation to improve a health state of the patient.

\* \* \* \* \*